US012570370B2

(12) United States Patent
Nagata

(10) Patent No.: US 12,570,370 B2
(45) Date of Patent: Mar. 10, 2026

(54) CONTROL SYSTEM FOR HUMAN-POWERED VEHICLE

(71) Applicant: SHIMANO Inc., Osaka (JP)

(72) Inventor: Kiichiro Nagata, Sakai (JP)

(73) Assignee: Shimano Inc., Osaka (JP)

( * ) Notice: Subject to any disclaimer, the term of this patent is extended or adjusted under 35 U.S.C. 154(b) by 921 days.

(21) Appl. No.: 17/744,063

(22) Filed: May 13, 2022

(65) Prior Publication Data

US 2022/0379995 A1 Dec. 1, 2022

(30) Foreign Application Priority Data

May 28, 2021 (JP) ................................. 2021-090448

(51) Int. Cl.
| | |
|---|---|
| *B62L 3/02* | (2006.01) |
| *B62J 45/20* | (2020.01) |
| *B62L 3/04* | (2006.01) |
| *B62M 6/45* | (2010.01) |
| *H04L 67/12* | (2022.01) |

(52) U.S. Cl.
CPC ................. *B62L 3/02* (2013.01); *B62J 45/20* (2020.02); *B62L 3/04* (2013.01); *B62M 6/45* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 6,540,309 B1 | 4/2003 | Jordan et al. | |
| 2018/0009508 A1* | 1/2018 | Suzuki | F16H 59/044 |
| 2019/0061716 A1 | 2/2019 | Takahashi et al. | |
| 2020/0377167 A1* | 12/2020 | Suzuki | B62K 25/04 |
| 2022/0281425 A1 | 9/2022 | Thomson | |

FOREIGN PATENT DOCUMENTS

| | | | | |
|---|---|---|---|---|
| CN | 106394802 A | | 2/2017 | |
| CN | 107685824 A | * | 2/2018 | ............... B62J 1/08 |
| CN | 109969322 A | | 7/2019 | |
| DE | 102018216373 A1 | | 3/2020 | |
| JP | 2017132454 A | | 8/2017 | |
| JP | 2019109106 A | * | 7/2019 | ............... B60S 5/00 |
| JP | 2019202659 A | | 11/2019 | |
| WO | 2021007617 A1 | | 1/2021 | |

OTHER PUBLICATIONS

CN-107685824-A: English Machine Translation (Year: 2018).*
JP-2019109106-A: English Machine Translation (Year: 2019).*

* cited by examiner

*Primary Examiner* — Melanie Torres Williams
(74) *Attorney, Agent, or Firm* — Alleman Hall LLP

(57) ABSTRACT

A control system in accordance for a human-powered vehicle comprises a brake device configured to brake a wheel, a brake operating device operated to actuate the brake device, a first communication path configured to communicate a first actuation signal between the brake device and the brake operating device, and a second communication path configured to communicate a second actuation signal between the brake device and the brake operating device. The second communication path differs from the first communication path.

23 Claims, 12 Drawing Sheets

START

S1
Operation of brake lever detected? — NO

YES

S2
Transmit 1st actuation signal

S3
1st response signal received? — YES

NO

S4
Transmit 2nd actuation signal

END

START

S11
1st actuation signal received? — NO

YES

S12
Transmit 1st response signal

S14
2nd actuation signal received? — NO

YES

S15
Transmit 2nd response signal

S13
Actuate brake actuator

END

START

S51

Detect
2nd mode switching
operation?

NO

YES

S52

Show message indicating anomaly

S53

Transmit anomaly signal

END

START

S61

Anomaly
signal received?

YES

NO

S62

Maintain 1st mode

S63

Switch to 2nd mode

END

Fig. 18

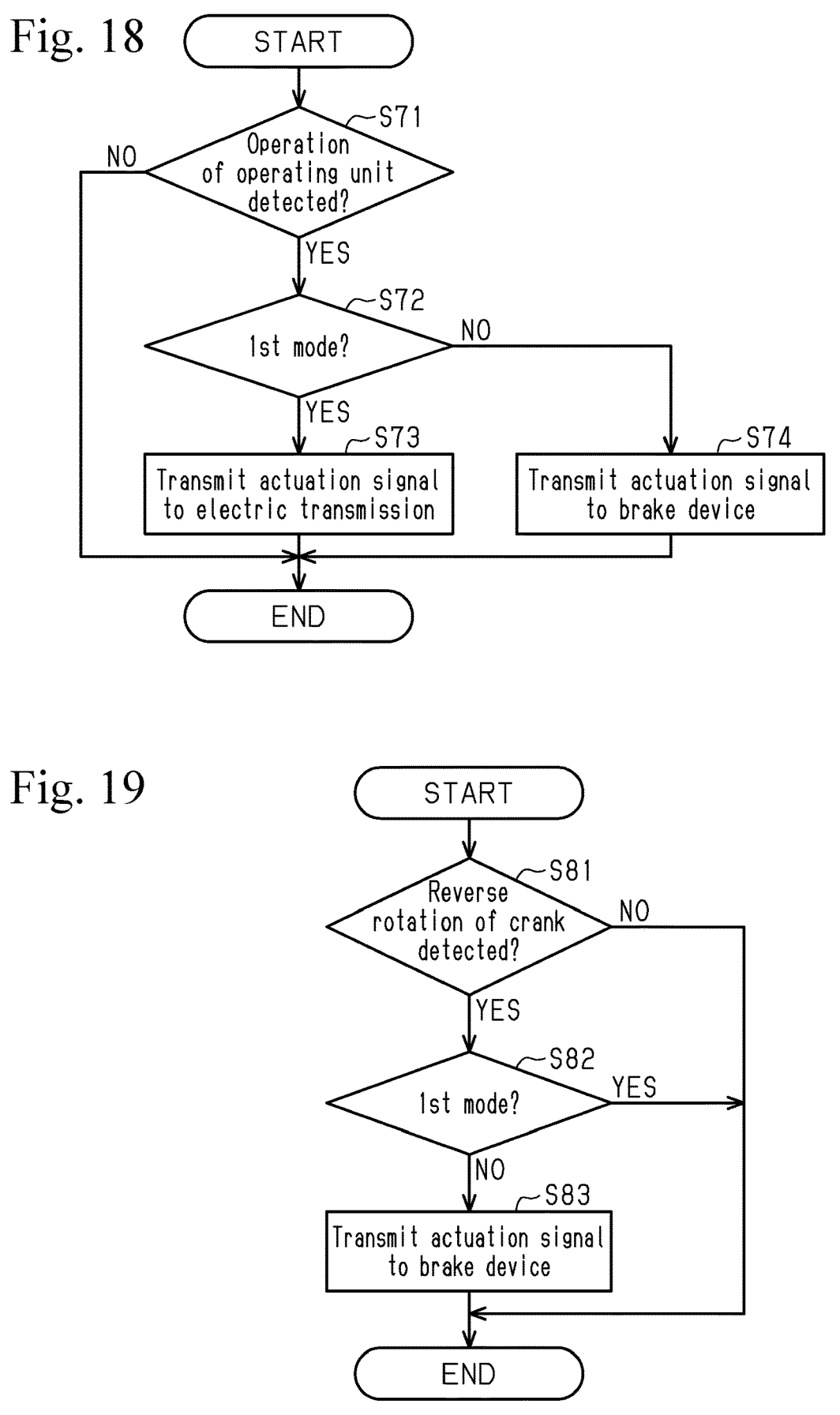

```
        ┌─────────────┐
        │    START    │
        └─────────────┘
               │
               ▼        ┌─S71
          ╱─────────────╲
  NO    ╱   Operation    ╲
◄──────┤  of operating unit │
        ╲   detected?    ╱
          ╲─────────────╱
               │ YES
               ▼        ┌─S72
          ╱─────────╲        NO
         ╱           ╲────────────────┐
        ┤  1st mode?  │                │
         ╲           ╱                 │
          ╲─────────╱                  │
               │ YES                   │
               ▼   ┌─S73               ▼   ┌─S74
   ┌──────────────────────┐   ┌──────────────────────┐
   │ Transmit actuation signal │   │ Transmit actuation signal │
   │  to electric transmission │   │    to brake device    │
   └──────────────────────┘   └──────────────────────┘
               │                       │
               ▼◄──────────────────────┘
        ┌─────────────┐
        │     END     │
        └─────────────┘
```

Fig. 19

```
        ┌─────────────┐
        │    START    │
        └─────────────┘
               │
               ▼        ┌─S81
          ╱─────────────╲
         ╱    Reverse     ╲     NO
        ┤ rotation of crank │────────────┐
         ╲   detected?    ╱              │
          ╲─────────────╱                │
               │ YES                     │
               ▼        ┌─S82            │
          ╱─────────╲       YES          │
         ╱           ╲────────────────►  │
        ┤  1st mode?  │                   │
         ╲           ╱                    │
          ╲─────────╱                     │
               │ NO                       │
               ▼   ┌─S83                  │
   ┌──────────────────────┐              │
   │ Transmit actuation signal │          │
   │    to brake device    │              │
   └──────────────────────┘              │
               │                          │
               ▼◄─────────────────────────┘
        ┌─────────────┐
        │     END     │
        └─────────────┘
```

CONTROL SYSTEM FOR HUMAN-POWERED VEHICLE

BACKGROUND ART

The present disclosure relates to a control system for a human-powered vehicle.

Patent document 1 discloses an electric brake system for a human-powered vehicle. An operating device is operated to actuate a brake device with electric power.

Patent Document 1: Japanese Laid-Open Patent Publication No. 2019-202659

SUMMARY

In a human-powered vehicle, a control system that actuates an actuation device, such as a brake device, in response to operation of an operating device is required to have high reliability.

One objective of the present disclosure is to provide a highly reliable control system for a human-powered vehicle.

A control system in accordance with a first aspect of the present disclosure is for a human-powered vehicle. The control system comprises a brake device configured to brake a wheel, a brake operating device operated to actuate the brake device, a first communication path configured to communicate a first actuation signal between the brake device and the brake operating device, and a second communication path configured to communicate a second actuation signal between the brake device and the brake operating device. The second communication path differs from the first communication path.

The control system in accordance with the first aspect includes a plurality of communication paths and has redundancy. This improves the reliability of communication between the brake device and the brake operating device and thereby improves the reliability of the control system.

In accordance with a second aspect of the present disclosure, the control system according to the first aspect further comprises a first communication control device provided in the brake operating device, a second communication control device provided in the brake device, and a third communication control device provided in at least one of the brake operating device and the first communication path. The first communication control device is configured to transmit the first actuation signal through the first communication path in response to operation of the brake operating device. The second communication control device is configured to transmit a response signal in response to receipt of the first actuation signal. The third communication control device is configured to transmit the second actuation signal to the second communication control device through the second communication path in a case where the response signal cannot be received from the second communication control device after the first actuation signal is transmitted from the first communication control device.

With the control system in accordance with the second aspect, the second communication control device receives the second actuation signal through the second communication path in a case where the first actuation signal cannot be received. This improves the actuation reliability of the brake device.

In accordance with a third aspect of the present disclosure, the control system according to the second aspect is configured so that the first communication control device also functions as the third communication control device.

The control system in accordance with the third aspect simplifies the configuration of the control system.

A control system in accordance with a fourth aspect of the present disclosure is for a human-powered vehicle. The control system comprises an actuation device, an operating device operated to actuate the actuation device, a first communication control device provided in the operating device, a second communication control device provided in the actuation device, a first communication path configured to communicate a first actuation signal between the first communication control device and the second communication control device, a third communication control device provided in at least one of the operating device and the first communication path, and a second communication path configured to communicate a second actuation signal between the second communication control device and the third communication control device. The second communication path differs from the first communication path. The first communication control device is configured to transmit the first actuation signal through the first communication path in response to operation of the operating device. The second communication control device is configured to transmit a response signal in response to receipt of the first actuation signal. The third communication control device is configured to transmit the second actuation signal through the second communication path in a case where the response signal cannot be received from the second communication control device after the first actuation signal is transmitted from the first communication control device.

With the control system in accordance with the fourth aspect, the second communication control device receives the second actuation signal through the second communication path in a case where the first actuation signal cannot be received. This improves the reliability with respect to actuation of the actuation device.

In accordance with a fifth aspect of the present disclosure, the control system according to the fourth aspect is configured so that the actuation device includes at least one of a brake device, an electric transmission, an electric assist drive unit, a suspension, and an adjustable seatpost.

With the control system in accordance with the fifth aspect, the actuation reliability of the brake device, the electric transmission, the electric assist drive unit, the suspension, and the adjustable seatpost is improved.

In accordance with a sixth aspect of the present disclosure, the control system according to the fourth or fifth aspect is configured so that the first communication control device also functions as the third communication control device.

The control system in accordance with the sixth aspect simplifies the configuration of the control system.

In accordance with a seventh aspect of the present disclosure, the control system according to any one of the second to sixth aspects is configured so that the third communication control device is provided in a component located in the first communication path.

With the control system in accordance with the seventh aspect, the second communication control device can receive the second actuation signal through the second communication path from the third communication device in a case where an anomaly or the like occurs in a portion of the first communication path between the third communication control device and the second communication control device.

In accordance with an eighth aspect of the present disclosure, in the control system according to any one of the second to seventh aspects, the second communication control device is configured to transmit a first response signal in response to receipt of the first actuation signal through the first communication path, and the second communication control device is configured to transmit a second response signal through the second communication path in response to receipt of the second actuation signal.

With the control system in accordance with the eighth aspect, the second communication control device can perform communication through the second communication path in a case where the first communication path has an anomaly.

In accordance with a ninth aspect of the present disclosure, the control system according to any one of the second to eighth aspects is configured so that one of the first communication path and the second communication path is a wired communication path, the other one of the first communication path and the second communication path is a wireless communication path, and the first communication control device, the second communication control device, and the third communication control device each include a wired communication unit configured to perform wired communication and a wireless communication unit configured to perform wireless communication.

With the control system in accordance with the ninth aspect, in a case where one of the wired communication path and the wireless communication path has an anomaly, communication is performed through the other one of the wired communication path and the wireless communication path. Further, in comparison with a case in which the first communication path and the second communication path are both wired communication paths, the human-powered vehicle has a better appearance, and a wiring process of the human-powered vehicle is simplified.

In accordance with a tenth aspect of the present disclosure, the control system according to any one of the second to eighth aspects is configured so that the first communication path is a wired communication path, and the second communication path is a wireless communication path. The first communication control device, the second communication control device, and the third communication control device each include a wired communication unit configured to perform wired communication through the first communication path and a wireless communication unit configured to perform wireless communication through the second communication path.

With the control system in accordance with the tenth aspect, in a case where the wired communication path has an anomaly, communication is performed through the wireless communication path. Further, in a case where the wired communication path does not have an anomaly, the wireless communication path is not used. This reduces the electric power used for communication.

In accordance with an eleventh aspect of the present disclosure, the control system according to any one of the first to eighth aspects is configured so that each of the first communication path and the second communication path is a wired communication path or a wireless communication path.

With the control system in accordance with the eleventh aspect, in a case where one of the first communication path and the second communication path has an anomaly, communication is performed through the other one of the first communication path and the second communication path.

In accordance with a twelfth aspect of the present disclosure, the control system according to any one of the first to eighth aspects is configured so that one of the first communication path and the second communication path is a wired communication path, and the other one of the first communication path and the second communication path is a wireless communication path.

With the control system in accordance with the twelfth aspect, in a case where one of the wired communication path and the wireless communication path has an anomaly, communication is performed through the other one of the wired communication path and the wireless communication path. Further, in comparison with a case in which the first communication path and the second communication path are both wired communication paths, the human-powered vehicle has a better appearance and a process for wiring the human-powered vehicle is simplified.

In accordance with a thirteenth aspect of the present disclosure, the control system according to any one of the first to eighth aspects is configured so that the first communication path is a wired communication path, and the second communication path is a wireless communication path.

With the control system in accordance with the thirteenth aspect, in a case where the wired communication path has an anomaly, communication is performed through the wireless communication path.

A control system in accordance with a fourteenth aspect is for a human-powered vehicle. The control system comprises a brake device configured to brake a wheel, a brake operating device operated to actuate the brake device, an auxiliary brake operating device that differs from the brake operating device, and a controller configured to control an actuation device that includes the brake device in accordance with a control mode. The control mode includes a first mode and a second mode. The controller is configured to restrict actuation of the brake device in response to operation of the auxiliary brake operating device in a case where the control mode is the first mode, and the controller is configured to actuate the brake device in response to operation of the auxiliary brake operating device in a case where the control mode is the second mode.

With the control system in accordance with the fourteenth aspect, in the second mode, the auxiliary brake operating device is used to actuate the brake device in the second mode. This improves the actuation reliability of the brake device.

In accordance with a fifteenth aspect of the present disclosure, the control system according to the fourteenth aspect further comprises a communication path provided between the brake device and the brake operating device. In a case where the first mode is selected as the control mode and at least one of the brake device, the brake operating device, and the communication path has an anomaly, the controller is configured to switch the control mode from the first mode to the second mode.

With the control system in accordance with the fifteenth aspect, in a case where at least one of the brake device, the brake operating device, and the communication path has an anomaly, the auxiliary brake operating device is used to actuate the brake device.

In accordance with a sixteenth aspect of the present disclosure, the control system according to the fifteenth aspect further comprises a detection device configured to detect the anomaly in at least one of the brake device, the brake operating device, and the communication path. In a case where the first mode is selected as the control mode and the detection device detects the anomaly, the controller is configured to switch the control mode from the first mode to the second mode.

With the control system in accordance with the sixteenth aspect, in a case where the detection device detects an anomaly in at least one of the brake device, the brake operating device, and the communication path, the auxiliary brake operating device is used to actuate the brake device. This improves the actuation reliability of the brake device.

In accordance with a seventeenth aspect of the present disclosure, the control system according to the fifteenth or sixteenth aspect is configured so that the communication path is a wired communication path.

With the control system in accordance with the seventeenth aspect, in a case where the wired communication path has an anomaly, the auxiliary brake operating device is used to actuate the brake device.

In accordance with an eighteenth aspect of the present disclosure, the control system according to any one of the fourteenth to seventeenth aspects is configured so that the brake operating device includes a brake lever and a sensor that detects operation of the brake lever. In a case where the first mode is selected as the control mode and the sensor has an anomaly, the controller is configured to switch the control mode from the first mode to the second mode.

With the control system in accordance with the eighteenth aspect, in a case where the sensor that detects operation of the brake lever has an anomaly, the auxiliary brake operating device is used to actuate the brake device.

In accordance with a nineteenth aspect of the present disclosure, the control system according to any one of fourteenth to eighteenth aspects further comprises a mode switching unit operated to switch the control mode between the first mode and the second mode.

With the control system in accordance with the nineteenth aspect, the mode switching unit is operated to switch the control mode from the first mode to the second mode. This allows the auxiliary brake operating device to be used to actuate the brake device.

In accordance with a twentieth aspect of the present disclosure, in the control system according to any one of the fourteenth to nineteenth aspects, the controller is configured to actuate an actuation device that differs from the brake device in response to operation of the auxiliary brake operating device in a case where the control mode is the first mode.

With the control system in accordance with the twentieth aspect, the auxiliary brake operating device used to actuate the actuation device that differs from the brake device in the first mode is used to actuate the brake device in the second mode.

In accordance with a twenty-first aspect of the present disclosure, the control system according to the twentieth aspect is configured so that the actuation device that differs from the brake device includes at least one of an electric transmission, an electric assist drive unit, a suspension, and an adjustable seatpost.

With the control system in accordance with the twenty-first aspect, the auxiliary brake operating device used to actuate one of the electric transmission, the electric assist drive unit, the suspension, and the adjustable seatpost in the first mode is used to actuate the brake device in the second mode.

In accordance with a twenty-second aspect of the present disclosure, the control system according to any one of the fourteenth to twenty-first aspects is configured so that the auxiliary brake operating device is a crank. The controller is configured to restrict actuation of the brake device in response to reverse rotation of the crank in a case where the control mode is the first mode, and the controller is configured to actuate the brake device in response to reverse rotation of the crank in a case where the control mode is the second mode.

With the control system in accordance with the twenty-second aspect, in a case where the control mode is the second mode, reverse rotation of the crank actuates the brake device.

In accordance with a twenty-third aspect of the present disclosure, in the control system according to the twenty-second aspect, the controller is configured to control the brake device and produce braking force that is in accordance with a reverse rotational speed of the crank.

With the control system in accordance with the twenty-third aspect, the reverse rotational speed of the crank is changed to adjust the braking force of the brake device.

In accordance with a twenty-fourth aspect of the present disclosure, the control system according to any one of the fourteenth to twenty-third aspects is configured so that the controller is provided in at least one of the auxiliary brake operating device, the brake device, and the electric assist drive unit.

With the control system in accordance with the twenty-fourth aspect, in a case where the control mode is the second mode, the auxiliary brake operating device is used to actuate the brake device.

The human-powered vehicle control system in accordance with the present disclosure provides a highly reliable control system.

BRIEF DESCRIPTION OF THE DRAWINGS

FIG. 18 is a flowchart of a brake operating process executed by the controller of the auxiliary brake operating device illustrated in FIG. 13.

FIG. 19 is a flowchart of a brake operating process executed by the controller of the electric assist drive unit illustrated in FIG. 13.

EMBODIMENTS OF THE DISCLOSURE

First Embodiment

Figure 1:
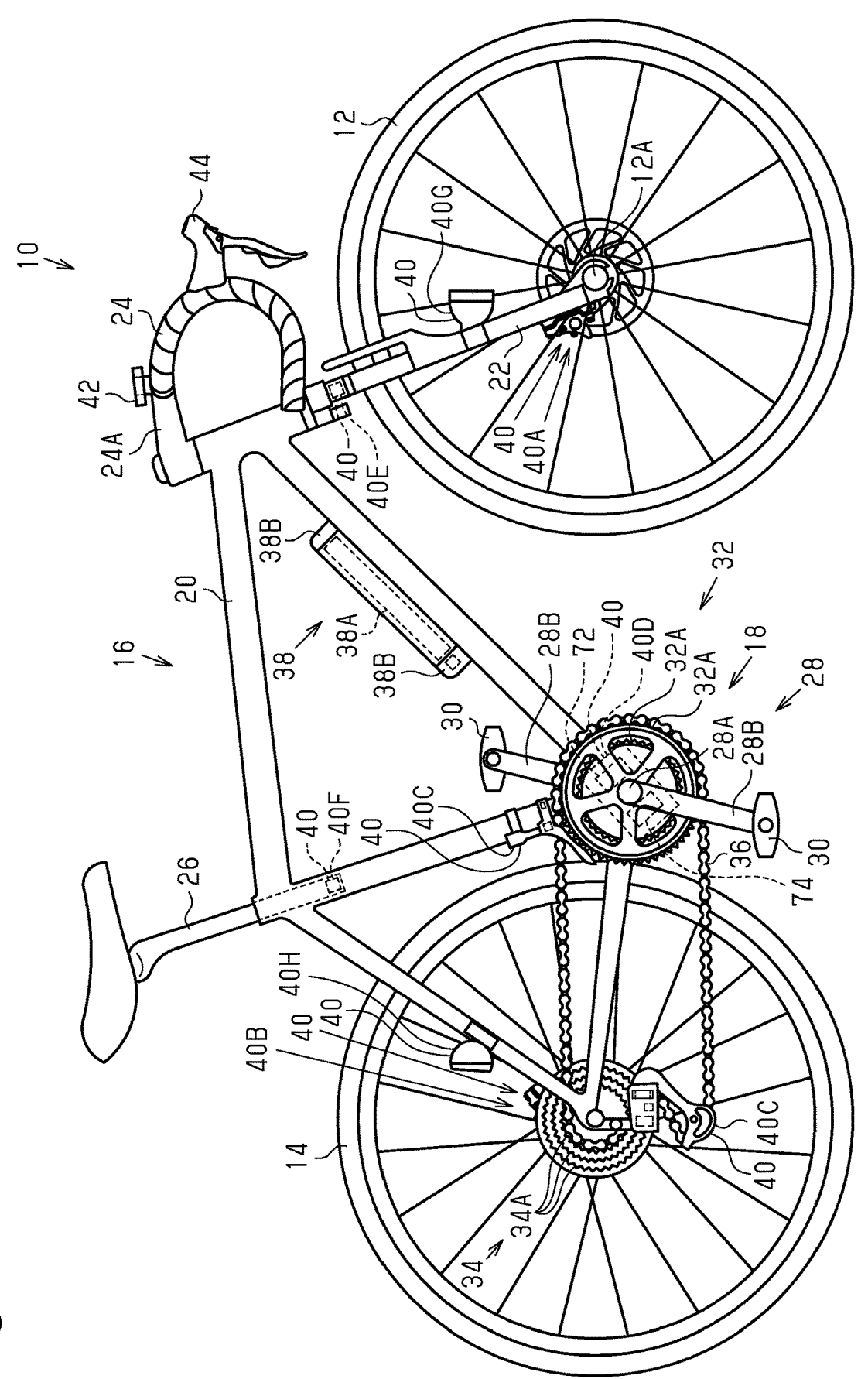
FIG. 1 is a side view of a human-powered vehicle including a control system in accordance with a first embodiment.

A control system for a human-powered vehicle in accordance with a first embodiment will now be described with reference to FIGS. 1 to 12. FIG. 1 shows a human-powered vehicle 10 that is a vehicle including at least one wheel and driven by at least human driving force. The human-powered vehicle 10 includes, for example, various types of bicycles such as a mountain bike, a road bike, a city bike, a cargo bike, a handcycle, and a recumbent bike. The number of wheels of the human-powered vehicle 10 is not limited. The human-powered vehicle 10 includes, for example, a monocycle and vehicles having three or more wheels. The human-powered vehicle 10 is not limited to a vehicle driven only by human driving force. The human-powered vehicle 10 includes an e-bike that uses not only human driving force but also drive force of an electric motor for propulsion. An e-bike includes an electric assist bicycle that uses an electric motor to assist in propulsion. In the description hereafter, the human-powered vehicle 10 refers to a bicycle.

In the present specification, the frame of reference for the terms indicating directions such as "front", "rear", "forward", "rearward", "left", "right", "sideward", "upward", "downward", as well as other analogous terms indicating directions, will be based on the view of a rider who is facing a handlebar 24 from a reference position (e.g., on saddle or seat) of the human-powered vehicle 10.

As shown in FIG. 1, the human-powered vehicle 10 includes a front wheel 12, a rear wheel 14, a human-powered vehicle main body 16, a drive mechanism 18, a battery unit 38, actuation devices 40, a cycle computer 42, and an operating unit 44. The human-powered vehicle main body 16 includes a frame 20, a front fork 22, the handlebar 24, and a seatpost 26. The actuation devices 40 include brake devices 40A and 40B, an electric transmission 40C, an electric assist drive unit 40D, a suspension 40E, an adjustable seatpost 40F, a front lamp 40G, and a rear lamp 40H. In the present embodiment, the brake device 40A is a front brake device 40A supported by the front fork 22. In the present embodiment, the brake device 40B is a rear brake device 40B supported by the frame 20. The actuation devices 40 can include only one of the front brake device 40A and the rear brake device 40B. The actuation device 40 are also each referred to as a human-powered vehicle component. The front fork 22 is supported by the frame 20 and connected to an axle 12A of the front wheel 12. The handlebar 24 is connected to a stem 24A of the front fork 22 in a detachable manner. The seatpost 26 is connected to the frame 20 and supported by the frame 20.

The battery unit 38 is attached to, for example, the frame 20. The cycle computer 42 is attached to, for example, the handlebar 24. The human-powered vehicle 10 can include a plurality of operating units 44. The operating units 44 are attached to, for example, the left side and right side of the handlebar 24. FIG. 1 shows the operating unit 44 attached to the right side of the handlebar 24.

Human driving force is transmitted via the drive mechanism 18 to the rear wheel 14 to move the human-powered vehicle 10. The drive mechanism 18 includes a crank 28, a pair of pedals 30, a front rotational body 32, a rear rotational body 34, and a chain 36.

The crank 28 includes a crank axle 28A and a pair of crank arms 28B. In a case where the crank 28 is provided in the electric assist drive unit 40D, the drive mechanism 18 can include part of the electric assist drive unit 40D. In this case, the drive mechanism 18 includes, for example, an output portion of the electric assist drive unit 40D and a coupling portion that couples the crank axle 28A to the output portion of the electric assist drive unit 40D.

In the present embodiment, the crank axle 28A is rotatably supported by a housing of the electric assist drive unit 40D that is coupled to the frame 20. The two crank arms 28B are attached to the crank axle 28A. Each pedal 30 is coupled to one of the crank arms 28B.

The front rotational body 32 is coupled to the crank axle 28A. In the present embodiment, the front rotational body 32 includes one or more front sprockets 32A. The rear rotational body 34 includes one or more rear sprockets 34A. The chain 36 is wound around the front rotational body 32 and the rear rotational body 34. In a case where the human driving force applied to the pedals 30 rotates the crank 28 in one direction, the rear wheel 14 is rotated in the same direction by the front rotational body 32, the chain 36, and the rear rotational body 34. In another example, the front rotational body 32 includes one or more front pulleys, and the rear rotational body 34 includes one or more rear pulleys coupled by a belt to the front rotational body 32.

The battery unit 38 includes a battery 38A and a battery holder 38B that attaches the battery 38A in a removable manner to the frame 20. The battery 38A includes a rechargeable battery. The battery 38A supplies electric power to at least one of the actuation devices 40 electrically connected to the battery 38A. The battery unit 38 can be accommodated in the frame 20. At least one of the actuation device 40 can be supplied with electric power from another battery instead of the battery 38A.

Figure 2:
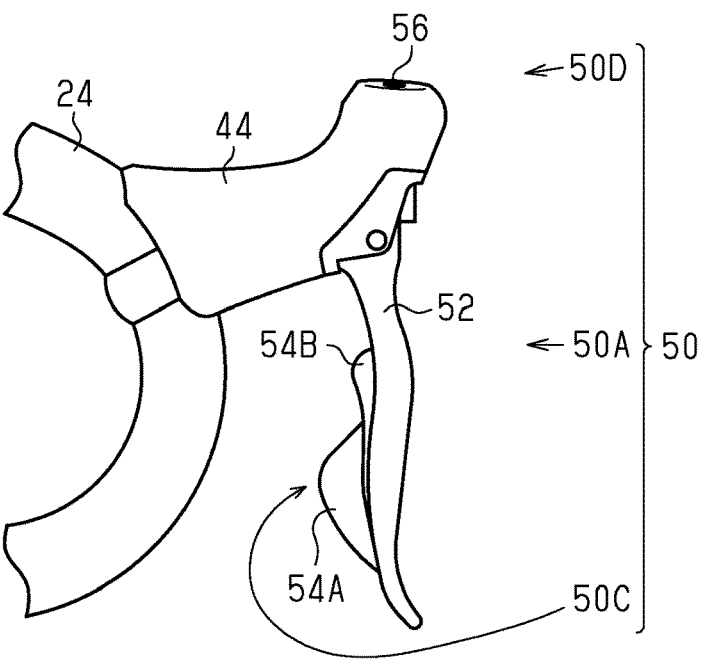
FIG. 2 is a side view showing a brake operating device of the human-powered vehicle illustrated in FIG. 1.
Figure 4:
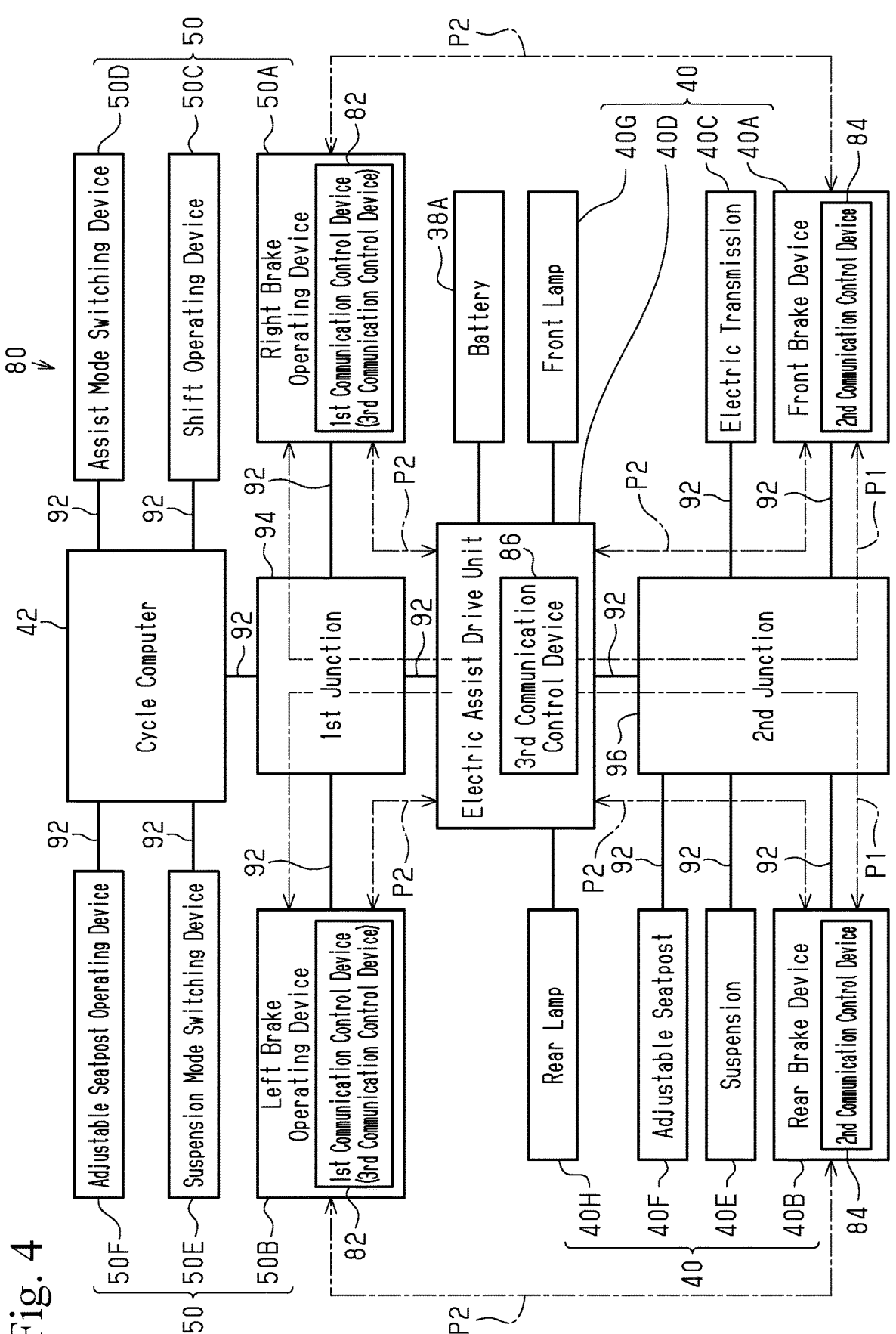
FIG. 4 is a block diagram showing the electrical configuration of the control system of the human-powered vehicle illustrated in FIG. 1.

As shown in FIG. 2, the operating unit 44 includes one or more operating devices 50. The operating devices 50 are operable by a rider. The operating devices 50 are operated to actuate the actuation devices 40. The actuation devices 40 can include at least one of the brake devices 40A and 40B, the electric transmission 40C, the electric assist drive unit 40D, the suspension 40E, and the adjustable seatpost 40F. The actuation devices 40 can further include at least one of the front lamp 40G and the rear lamp 40H. The actuation devices 40 are electric actuation devices. Each operating device 50 can incorporate a battery. As shown in FIG. 4, the operating devices 50 can include brake operating devices 50A and 50B, a shift operating device 50C, an assist mode switching device 50D, a suspension mode switching device 50E, and an adjustable seatpost operating device 50F.

The brake operating devices 50A and 50B are operated to actuate the brake devices 40A and 40B. As shown in FIG. 4, in the present embodiment, the brake operating devices 50A and 50B include a right brake operating device 50A operated to actuate the front brake device 40A and a left brake operating device 50B operated to actuate the rear brake device 40B. The shift operating device 50C is operated to actuate the electric transmission 40C. The assist mode switching device 50D is operated to switch the assist mode of the electric assist drive unit 40D. The suspension mode switching device 50E is operated to switch the state of the suspension 40E. The adjustable seatpost operating device 50F is operated to actuate the adjustable seatpost 40F. The operating devices 50 can further include a lamp operating device. The lamp operating device is operated to actuate the front lamp 40G and the rear lamp 40H.

The electric assist drive unit 40D is actuated to switch the assist mode in response to operation of the assist mode switching device 50D. The assist mode switching device 50D is an operating device operated to actuate the electric assist drive unit 40D. The suspension 40E is actuated to switch its state in response to operation of the suspension mode switching device 50E. The suspension mode switching device 50E is an operating device operated to actuate the suspension 40E.

In one example, the right operating unit 44 shown in FIG. 2 can include the right brake operating device 50A, the shift operating device 50C, and the assist mode switching device 50D. The right brake operating device 50A includes a brake lever 52. The shift operating device 50C includes a shift-up switch 54A and a shift-down switch 54B. The assist mode switching device 50D includes a mode selector 56. The left operating unit 44 can include the left brake operating device 50B, the suspension mode switching device 50E, and the adjustable seatpost operating device 50F. The left brake operating device 50B includes a left lever. The suspension mode switching device 50E includes a mode selector. The adjustable seatpost operating device 50F includes an adjustment switch. The brake operating devices 50A and 50B include road bike brake levers but can include mountain bike brake levers or city bike brake levers. The brake operating devices 50A and 50B does not have to include brake levers.

Figure 3:
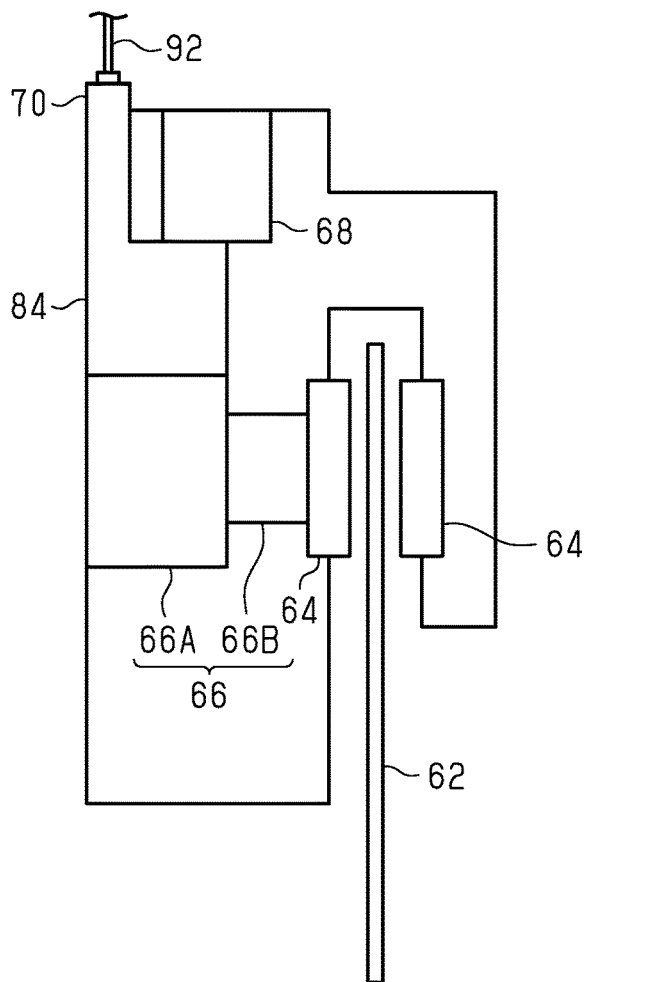
FIG. 3 is a schematic diagram showing a brake device of the human-powered vehicle illustrated in FIG. 1.

The brake devices 40A and 40B are configured to brake the wheels 12 and 14. In the present embodiment, the front brake device 40A is configured to brake the front wheel 12. In the present embodiment, the rear brake device 40B is configured to brake the rear wheel 14. The brake devices 40A and 40B can be rim brakes, disc brakes, or roller brakes. The brake devices 40A and 40B are, for example, electric brake devices. As shown in FIG. 3, in the present embodiment, the brake devices 40A and 40B are electric disc brakes. The brake devices 40A and 40B each include a disc rotor 62, a pair of brake pads 64, a brake actuator 66, a second communication control device 84, and a battery 68. The brake actuator 66 includes a motor unit 66A and a conversion mechanism 66B. The conversion mechanism 66B is, for example, a cam or a ball spline. The motor unit 66A is actuated in response to operation of the brake lever 52 of the corresponding one of the brake operating devices 50A and 50B. The conversion mechanism 66B converts the rotational motion produced by the motor unit 66A to linear motion so as to move and press at least one of the brake pads 64 against the disc rotor 62. The brake pads 64 clamp the disc rotor 62 to brake the corresponding one of the wheels 12 and 14. The second communication control device 84 includes a wired connector 70 connected to a communication cable 92.

The electric transmission 40C is configured to change the ratio of the rotational speed of the rear wheel 14 to the rotational speed of the crank 28. As shown in FIG. 1, the electric transmission 40C includes a rear derailleur. The rear derailleur is provided near the rear end of the frame 20. In a case where the rear rotational body 34 includes a plurality of rear sprockets 34A, the rear derailleur shifts the chain 36 from one rear sprocket 34A to another rear sprocket 34A. The electric transmission 40C can further include a front derailleur. The front derailleur is provided near the crank axle 28A. In a case where the front rotational body 32 includes a plurality of front sprockets 32A, the front derailleur shifts the chain 36 from one front sprocket 32A to another front sprocket 32A. The shift-up switch 54A or the shift-down switch 54B of the shift operating device 50C is operated to perform a shifting action with the electric transmission 40C.

The electric assist drive unit 40D assists in propulsion of the human-powered vehicle 10. The electric assist drive unit 40D includes an assist actuator 72. The assist actuator 72 includes an electric motor. In the present embodiment, the assist actuator 72 transmits driving force to a human driving force transmission path extending from the crank axle 28A to the front rotational body 32. The electric assist drive unit 40D includes a torque sensor that detects the torque applied to the crank 28. Preferably, the electric assist drive unit 40D further includes a crank sensor 74 that detects rotation of the crank 28. The assist actuator 72 is driven in accordance with the detection result of the torque sensor. The assist actuator 72 operates in a plurality of assist modes having different assist ratios. The electric assist drive unit 40D is actuated to switch the assist mode in response to operation of the mode selector 56 of the assist mode switching device 50D.

The suspension 40E is provided on the front fork 22 to dampen impacts applied to the front wheel 12. The suspension 40E is selectively switched between a lock state that restricts functioning of the suspension 40E and an unlock state that allows functioning of the suspension 40E. The suspension 40E can be provided on the frame 20 to dampen impacts applied to the rear wheel 14. The suspension 40E can be a hydraulic suspension, a pneumatic suspension, or a hybrid suspension, which is a hydraulic-pneumatic-combined suspension. The suspension 40E includes an electric motor or an electric actuator, such as an electromagnetic solenoid. The electric actuator controls a valve to open or close an oil passage or air passage. The suspension 40E is selectively switched between the lock state and the unlock state in response to operation of the mode selector of the suspension mode switching device 50E. In addition to being switched between the lock state and the unlock state, the suspension 40E can be configured to vary the damping force in steps. In this case, the suspension 40E varies the damping force by one step each time the suspension mode switching device 50E is operated.

The adjustable seatpost 40F is attached to the seatpost 26. The adjustable seatpost 40F lifts or lowers the seatpost 26 relative to the frame 20. The adjustable seatpost 40F includes an electric actuator such as an electric motor. The adjustable seatpost 40F lifts or lowers the seatpost 26 in response to operation of the adjustment switch of the adjustable seatpost operating device 50F.

The front lamp 40G is attached to the front fork 22 or the handlebar 24. The rear lamp 40H is attached to a rear part of the frame 20. The lamps 40G and 40H are configured to be switched between a turned-on state and a turned-off state. The lamps 40G and 40H are turned on or off in response to operation of the lamp operating device.

As shown in FIG. 4, a control system 80 for a human-powered vehicle includes the actuation device 40, the operating device 50, a first communication control device 82, the second communication control device 84, a first communication path P1, a third communication control device 86, and a second communication path P2. The first communication control device 82 is provided in the operating device 50. In the example shown in FIG. 4, the right brake operating device 50A and the left brake operating device 50B each include the first communication control device 82. The second communication control device 84 is provided in the actuation devices 40. In the example shown in FIG. 4, the front brake device 40A and the rear brake device 40B each include the second communication control device 84.

The third communication control device 86 is provided in the operating device 50. The third communication control device 86 is provided in the brake operating devices 50A and 50B, and the first communication control device 82 can also function as the third communication control device 86. In the present embodiment, the right brake operating device 50A and the left brake operating device 50B each include the first communication control device 82 that also functions as the third communication control device 86. In the present embodiment, although the first communication control device 82 also functions as the third communication control device 86, the third communication control device 86 will continue to be referred to as the third communication control device 86.

The first communication path P1 is configured to communicate a first actuation signal between the first communication control device 82 and the second communication control device 84. The first communication control device 82 is configured to transmit the first actuation signal through the first communication path P1 in response to operation of the corresponding operating device 50. The second communication control device 84 is configured to transmit a response signal in response to receipt of the first actuation signal. The third communication control device 86 is provided in at least one of the operating device 50 and the first communication path P1. The second communication path P2 is configured to communicate a second actuation signal between the second communication control device 84 and the third communication control device 86. Further, the second communication path P2 differs from the first communication path P1. The third communication control device 86 is configured to transmit the second actuation signal through the second communication path P2 in a case where the response signal cannot be received from the second communication control device 84 after the first actuation signal is transmitted from the first communication control device 82.

As shown in FIG. 4, the control system 80 for a human-powered vehicle includes the brake devices 40A and 40B, the brake operating devices 50A and 50B, the first communication path P1, and the second communication path P2. The first communication path P1 is configured to communicate a first actuation signal between the brake devices 40A and 40B and the corresponding brake operating devices 50A and 50B. The second communication path P2 is configured to communicate a second actuation signal between the brake devices 40A and 40B and the corresponding brake operating devices 50A and 50B. Further, the second communication path P2 differs from the first communication path P1.

The control system 80 further includes the first communication control device 82, the second communication control device 84, and the third communication control device 86. The first communication control device 82 is provided in the brake operating devices 50A and 50B. The first communication control device 82 is configured to transmit the first actuation signal through the first communication path P1 in response to operation of the brake operating devices 50A and 50B. The second communication control device 84 is provided in the brake devices 40A and 40B. The second communication control device 84 is configured to transmit a response signal in response to receipt of the first actuation signal. The third communication control device 86 is provided in at least one of the brake operating devices 50A and 50B and the first communication path P1. The third communication control device 86 is configured to transmit the second actuation signal through the second communication path P2 to the second communication control device 84 in a case where the response signal cannot be received from the second communication control device 84 after the first actuation signal is transmitted from the first communication control device 82.

In the present embodiment, the second communication control device 84 is configured to transmit a first response signal through the first communication path P1 in response to receipt of the first actuation signal. The second communication control device 84 is configured to transmit a second response signal through the second communication path P2 in response to receipt of the second actuation signal.

As shown in FIG. 4, in the present embodiment, the operating devices 50 are connected by communication cables 92 to the cycle computer 42. For example, the shift operating device 50C, the assist mode switching device 50D, the suspension mode switching device 50E, and the adjustable seatpost operating device 50F are each connected by a communication cable 92 to the cycle computer 42. The cycle computer 42 is connected by a communication cable 92 to a first junction 94. The first junction 94 is connected by a communication cable 92 to the electric assist drive unit 40D. The right brake operating device 50A and the left brake operating device 50B are each connected by a communication cable 92 to the first junction 94. The battery 38A, the front lamp 40G, and the rear lamp 40H are electrically connected to the electric assist drive unit 40D. The electric assist drive unit 40D is connected by a communication cable 92 to a second junction 96. The actuation devices 40 are each connected by a communication cable 92 to the second junction 96. For example, the front brake device 40A, the rear brake device 40B, the electric transmission 40C, the adjustable seatpost 40F, and the suspension 40E are each connected by a communication cable 92 to the second junction 96. The communication cable 92 is an electric power line configured to perform Power Line Communication (PLC). The communication cable 92 can be a communication line that does not transmit electric power.

Instead of the brake operating devices 50A and 50B or in addition to the brake operating devices 50A and 50B, the operating devices 50 that include the first communication control device 82 can be at least one of the shift operating device 50C, the assist mode switching device 50D, the suspension mode switching device 50E, and the adjustable seatpost operating device 50F. The first communication control device 82 can also function as the third communication control device 86 in this case.

Instead of the brake devices 40A and 40B or in addition to the brake devices 40A and 40B, the actuation devices 40 that include the second communication control device 84 can be at least one of the electric transmission 40C, the electric assist drive unit 40D, the suspension 40E, and the adjustable seatpost 40F.

The third communication control device 86 can be provided in a component located in the first communication path P1. In the present embodiment, the electric assist drive unit 40D that is located in the first communication path P1 includes the third communication control device 86. The third communication control device 86 can be provided in at least one of the first junction 94 and the second junction 96. Further, the third communication control device 86 can be provided anywhere in the first communication path P1.

Figure 5:
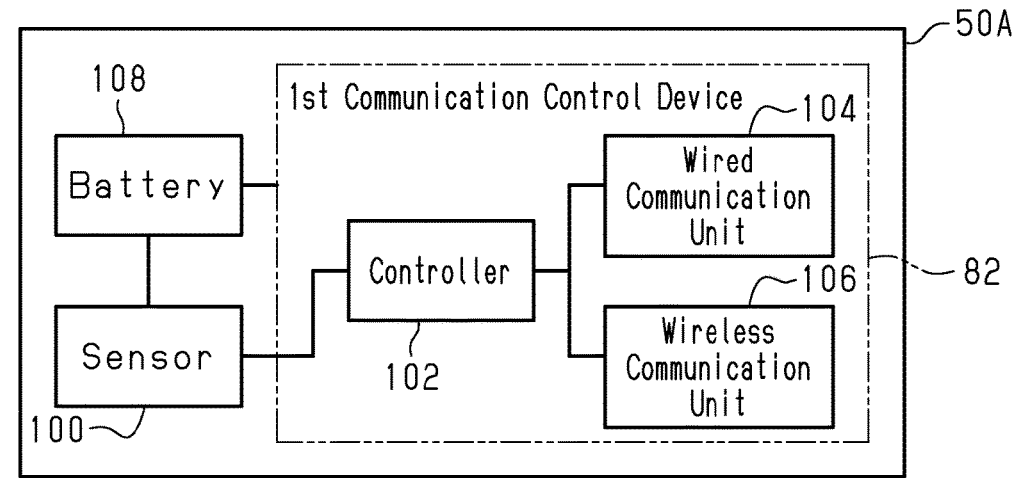
FIG. 5 is a block diagram showing the electrical configuration of a brake operating device included in the control system of FIG. 4.
Figure 6:
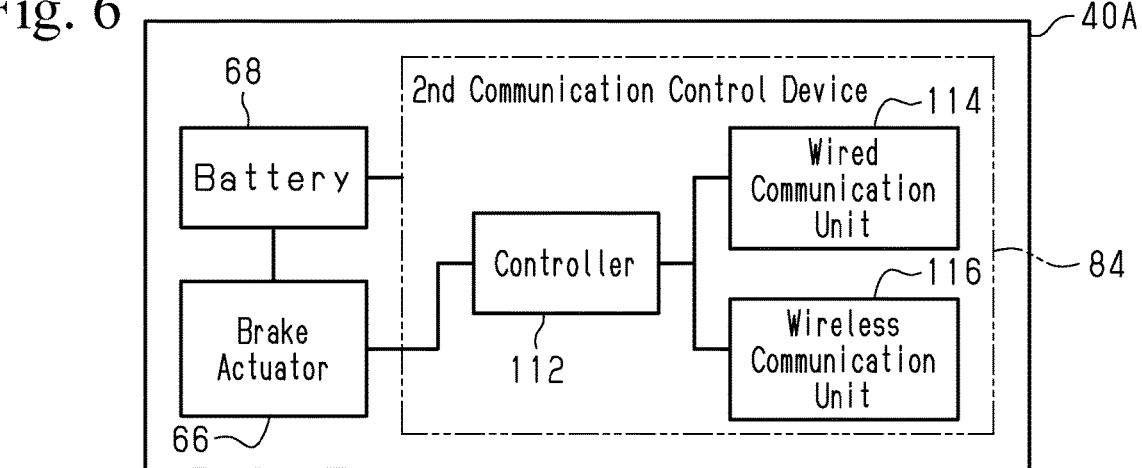
FIG. 6 is a block diagram showing the electrical configuration of a brake device included in the control system of FIG. 4.
Figure 7:
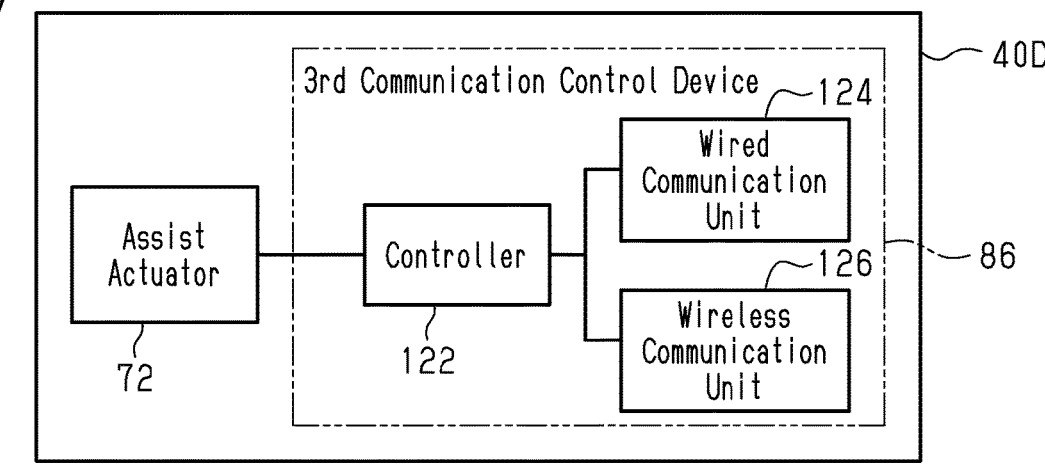
FIG. 7 is a block diagram showing the electrical configuration of an electric assist drive unit included in the control system of FIG. 4.

Each of the first communication path P1 and the second communication path P2 is a wired communication path or a wireless communication path. The wired communication path is configured to perform Power Line Communication (PLC). Preferably, one of the first communication path P1 and the second communication path P2 is a wired communication path and the other one of the first communication path P1 and the second communication path P2 is a wireless communication path. As shown in FIGS. 5 to 7, the first communication control device 82, the second communication control device 84, and the third communication control device 86 respectively include wired communication units 104, 114, and 124 that are configured to perform wired communication and wireless communication units 106, 116, and 126 that are configured to perform wireless communication. In the present embodiment, the first communication path P1 is a wired communication path, and the second communication path P2 is a wireless communication path. As shown in FIGS. 5 to 7, the first communication control device 82, the second communication control device 84, and the third communication control device 86 respectively include the wired communication units 104, 114, and 124 and the wireless communication units 106, 116, and 126. The wired communication units 104, 114, and 124 are configured to perform wired communication through the first communication path P1. The wireless communication units 106, 116, and 126 are configured to perform wireless communication through the second communication path P2.

As shown in FIG. 4, in the present embodiment, the communication cables 92 that connect the right brake operating device 50A via the first junction 94, the electric assist drive unit 40D, and the second junction 96 to the front brake device 40A form the first communication path P1 that is a wired communication path. The communication cables 92 that connect the left brake operating device 50B via the first junction 94, the electric assist drive unit 40D, and the second junction 96 to the rear brake device 40B also form the first communication path P1 that is a wired communication path. The second communication path P2, which is a wireless communication path, is provided between the right brake operating device 50A and the front brake device 40A. The second communication path P2, which is a wireless communication path, is also provided between the left brake operating device 50B and the rear brake device 40B. The brake devices 40A and 40B respectively corresponding to the brake operating devices 50A and 50B can perform both wired communication and wireless communication. The second communication path P2, which is a wireless communication path, can be provided between the electric assist drive unit 40D and each of the brake operating devices 50A and 50B or between the electric assist drive unit 40D and each of the brake devices 40A and 40B. The electric assist drive unit 40D can perform both wired communication and wireless communication with the brake operating devices

50A and 50B and perform both wired communication and wireless communication with the brake devices 40A and 40B.

FIG. 5 shows the electrical configuration of the right brake operating device 50A. The left brake operating device 50B has the same configuration. Thus, the left brake operating device 50B will also be described using FIG. 5. The brake operating devices 50A and 50B each include the first communication control device 82, a battery 108, and a sensor 100. The first communication control device 82 is a circuit including a controller 102, a wired communication unit 104, and a wireless communication unit 106. The wired communication unit 104 is a circuit configured to perform wired communication with each element of the control system 80 through the communication cables 92. The wireless communication unit 106 is a circuit configured to perform wireless communication with the corresponding one of the brake devices 40A and 40B. The wireless communication unit 106 can be configured to perform wireless communication with elements other than the brake devices 40A and 40B, for example, the electric assist drive unit 40D. The battery 108 supplies electric power to the first communication control device 82. The sensor 100 detects operation of the brake lever 52 and outputs an operation detection signal to the controller 102 at a level corresponding to the operated amount of the brake lever 52. Upon receipt of the operation detection signal, the controller 102 transmits an actuation signal, including information indicating the operated amount of the brake lever 52, to the corresponding one of the brake devices 40A and 40B. The actuation signal includes a first actuation signal and a second actuation signal. The first actuation signal is transmitted from the wired communication unit 104 through the first communication path P1. The second actuation signal is transmitted from the wireless communication unit 106 through the second communication path P2.

FIG. 6 shows the electrical configuration of the front brake device 40A. The rear brake device 40B has the same configuration. Thus, the rear brake device 40B will also be described using FIG. 6. The brake devices 40A and 40B each include the second communication control device 84, the battery 68, and the brake actuator 66. The second communication control device 84 is a circuit including a controller 112, a wired communication unit 114, and a wireless communication unit 116. The wired communication unit 114 is a circuit configured to perform wired communication with each element of the control system 80 through the communication cables 92. The wireless communication unit 116 is a circuit configured to perform wireless communication with the corresponding one of the brake operating devices 50A and 50B. The wireless communication unit 116 can be configured to perform wireless communication with elements other than the brake operating devices 50A and 50B, for example, the electric assist drive unit 40D. The battery 68 supplies electric power to the second communication control device 84 and the brake actuator 66. The controller 112 transmits a response signal through the wired communication unit 114 and the wireless communication unit 116 in a case where an actuation signal is received through the wired communication unit 114 or the wireless communication unit 116. The controller 112 drives the brake actuator 66 so as to produce braking force that is in accordance with the operated amount of the brake lever 52. The response signal includes a first response signal and a second response signal. The first response signal is transmitted from the wired communication unit 114 through the first communication path P1. The second response signal is transmitted from the wireless communication unit 116 through the second communication path P2.

As shown in FIG. 7, the electric assist drive unit 40D includes the third communication control device 86 and the assist actuator 72. The third communication control device 86 is a circuit including a controller 122, a wired communication unit 124, and a wireless communication unit 126. The wired communication unit 124 is a circuit configured to perform wired communication with each element of the control system 80 through the communication cables 92. The wireless communication unit 126 is a circuit configured to perform wireless communication with the brake operating devices 50A and 50B and the brake devices 40A and 40B. The controller 122 transmits an actuation signal through the wired communication unit 124 or the wireless communication unit 126 to the brake devices 40A and 40B in a case where the actuation signal is received through the wired communication unit 124 or the wireless communication unit 126 from the brake operating devices 50A and 50B. In a case where a response signal from the brake devices 40A and 40B cannot be received by the wired communication unit 124 or the wireless communication unit 126 after the actuation signal is received from the brake operating devices 50A and 50B, the controller 122 transmits an actuation signal through the wired communication unit 124 or the wireless communication unit 126 to the brake devices 40A and 40B. The actuation signal includes a first actuation signal and a second actuation signal. The first actuation signal is transmitted from the wired communication unit 124 through the first communication path P1. The second actuation signal is transmitted from the wireless communication unit 126 through the second communication path P2.

Figure 8:
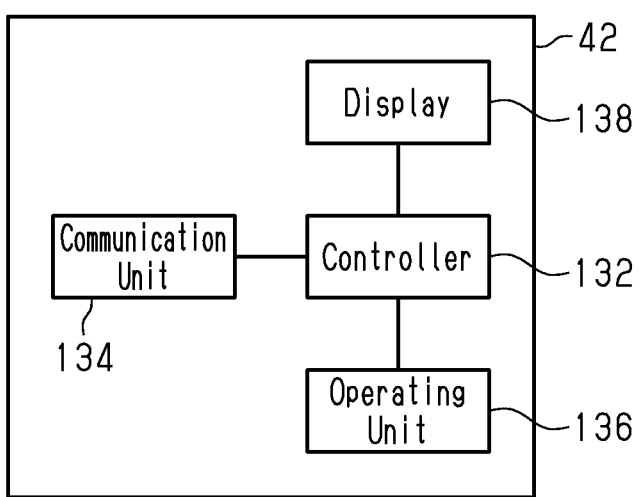
FIG. 8 is a block diagram showing the electrical configuration of a cycle computer included in the control system of FIG. 4.

As shown in FIG. 8, the cycle computer 42 includes a display 138, an operating unit 136, a controller 132, and a communication unit 134. The operating unit 136 is operable by a rider. In one example, the operating unit 136 includes one or more buttons. The display 138 is configured to show various types of information related to the human-powered vehicle 10. The various types of information related to the human-powered vehicle include information related to vehicle speed, information related to cadence, information related to heart rate, and information related to distance traveled. The display 138 is configured to show information related to the actuation devices 40 controlled in accordance with operation of the operating devices 50. The display 138 includes a display panel. The display panel includes, for example, a liquid crystal display panel or an organic electroluminescence (EL) display panel. The communication unit 134 is a circuit configured to perform wired communication with each element of the control system 80 through the communication cables 92. The communication unit 134 can include a wireless communication unit.

Figure 9:
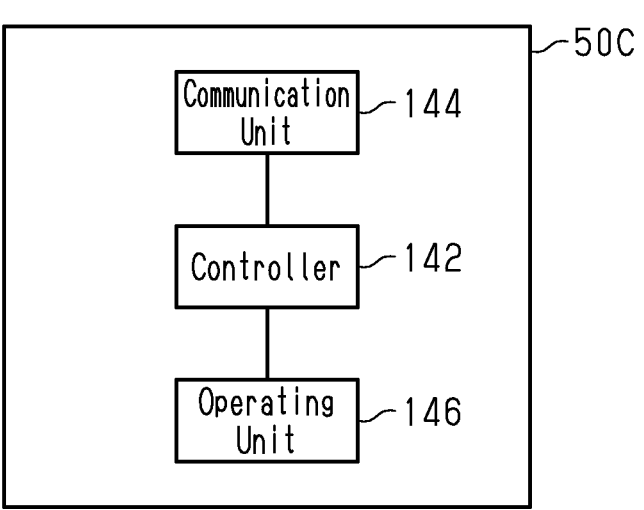
FIG. 9 is a block diagram showing the electrical configuration of a shift operating device included in the control system of FIG. 4.

FIG. 9 shows the electrical configuration of the shift operating device 50C. The assist mode switching device 50D, the suspension mode switching device 50E, and the adjustable seatpost operating device 50F have the same configuration. Thus, the operating devices 50D, 50E, and 50F will also be described using FIG. 9. The operating devices 50C, 50D, 50E, and 50F each include an operating unit 146, a controller 142, and a communication unit 144. The operating unit 146 is operable by a rider. The shift operating device 50C includes the shift-up switch 54A and the shift-down switch 54B as the operating unit 146. The assist mode switching device 50D includes the mode selector 56 as the operating unit 146. The suspension mode switching device 50E includes the mode selector as the operating unit 146. The adjustable seatpost operating device 50F includes the adjustment switch as the operating unit 146. The controller 142 transmits an actuation signal in accordance with operation of the operating unit 146 through the communication unit 144. The communication unit 144 is a circuit configured to perform wired communication with each element of the control system 80 through the communication cables 92. The communication unit 144 can include a wireless communication unit. In this case, the actuation device 40 corresponding to each of the operating devices 50C, 50D, 50E, and 50F also includes a wireless communication unit.

With reference to FIGS. 5 to 9, each of the controllers 102, 112, 122, 132, and 142 is a processor or processing circuit that executes predetermined programs. The controllers 102, 112, 122, 132, and 142 include, for example, a central processing unit (CPU) or a micro-processing unit (MPU). Preferably, each of the controllers 102, 112, 122, 132, and 142 includes a memory that stores programs. The memory includes, for example, a non-volatile memory and a volatile memory. The nonvolatile memory includes, for example, at least one of a read-only memory (ROM), an erasable programmable read-only memory (EPROM), an electrically erasable programmable read-only memory (EEPROM), and a flash memory. The volatile memory includes, for example, a random access memory (RAM). The controllers 102, 112, 122, 132, and 142 do not necessarily have to process software. For example, the controllers 102, 112, 122, 132, and 142 can each include a dedicated hardware circuit, for example, an application specific integrated circuit (ASIC), to execute at least part of the processes. The controllers 102, 112, 122, 132, and 142 can each be formed by at least one of a circuit that executes a software process in accordance with programs or a hardware circuit that executes a hardware process.

Figures 10, 11:
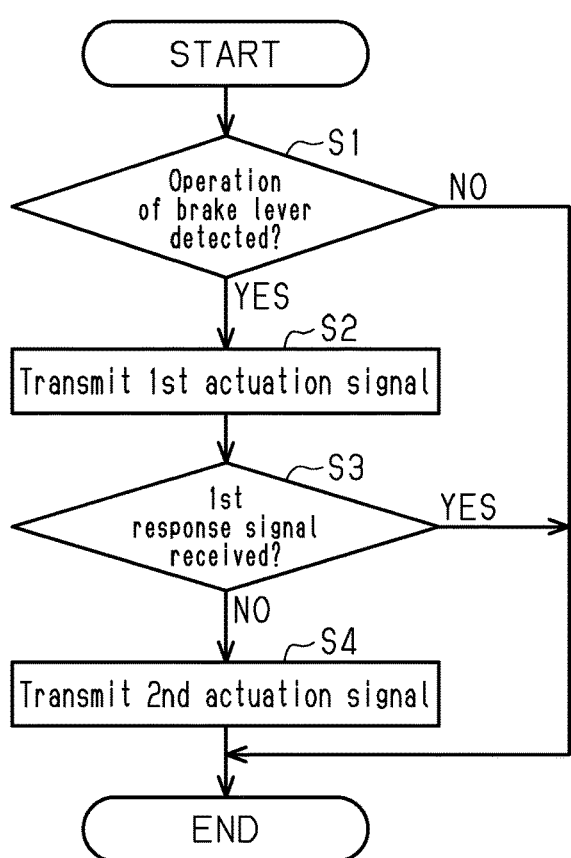
FIG. 10 is a flowchart of a process executed by a controller of the brake operating device illustrated in FIG. 5.
FIG. 11 is a flowchart of a process executed by a controller of the brake device illustrated in FIG. 6.

With reference to FIG. 10, the actions of the controller 102 of the first communication control device 82 in each of the brake operating devices 50A and 50B will now be described. The process illustrated in the flowchart of FIG. 10 is repetitively executed at predetermined time intervals. In the flowchart of FIG. 10, the first communication control device 82 also functions as the third communication control device 86.

In step S1, the controller 102 determines whether the sensor 100 has detected operation of the brake lever 52 from the operation detection signal of the sensor 100. In a case where the controller 102 determines in step S1 that the sensor 100 has not detected operation of the brake lever 52, the controller 102 ends processing. In a case where the controller 102 determines in step S1 that the sensor 100 has detected operation of the brake lever 52, the controller 102 proceeds to step S2. In step S2, the controller 102 transmits a first actuation signal from the wired communication unit 104 through the first communication path P1 to the corresponding one of the brake devices 40A and 40B and then proceeds to step S3.

In step S3, the controller 102 determines whether a first response signal has been received from the corresponding one of the brake devices 40A and 40B. For example, an affirmative determination is given in step S3 in a case where a first response signal is received within a specified time from transmission of the first actuation signal. Alternatively, an affirmative determination is given in step S3 in a case where a first response signal is received during a period in which the first actuation signal is transmitted a specified number of times. In a case where the controller 102 determines that a first response signal has been received in step S3, the controller 102 ends processing. In a case where the controller 102 determines that a first response signal has not been received in step S3, the controller 102 proceeds to step S4 and transmits a second actuation signal from the wireless communication unit 106 through the second communication path P2 to the corresponding one of the brake devices 40A and 40B before ending processing.

With reference to FIG. 11, the actions of the controller 112 of the second communication control device 84 in each of the brake devices 40A and 40B will now be described. The process illustrated in the flowchart of FIG. 11 is repetitively executed at predetermined time intervals.

In step S11, the controller 112 determines whether a first actuation signal has been received through the first communication path P1 by the wired communication unit 114. In a case where the controller 112 determines that a first actuation signal has been received in step S11, the controller 112 proceeds to step S12. In step S12, the controller 112 transmits a first response signal from the wired communication unit 114 through the first communication path P1 to the corresponding one of the brake operating devices 50A and 50B and then proceeds to step S13. In step S13, the controller 112 actuates the brake actuator 66 of the corresponding one of the brake devices 40A and 40B and then ends processing.

In a case where the controller 112 determines that a first actuation signal has not been received in step S11, the controller 112 proceeds to step S14. In step S14, the controller 112 determines whether a second actuation signal has been received through the second communication path P2 by the wireless communication unit 116. In a case where the controller 112 determines that a second actuation signal has not been received in step S14, the controller 112 ends processing. In a case where the controller 112 determines that a second actuation signal has been received in step S14, the controller 112 proceeds to step S15. In step S15, the controller 112 transmits a second response signal from the wireless communication unit 116 through the second communication path P2 to the corresponding one of the brake operating devices 50A and 50B and then proceeds to step S13. In step S13, the controller 112 actuates the brake actuator 66 of the corresponding one of the brake devices 40A and 40B and then ends processing.

Figure 12:
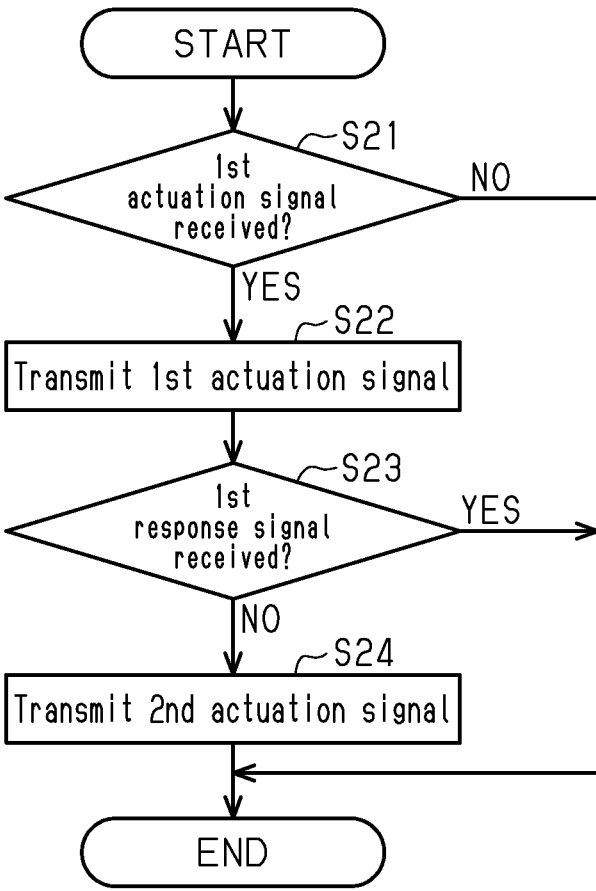
FIG. 12 is a flowchart of a process executed by a controller of the electric assist drive unit illustrated in FIG. 7.

With reference to FIG. 12, the actions of the controller 122 of the third communication control device 86 in the electric assist drive unit 40D will now be described. The process illustrated in the flowchart of FIG. 12 is repetitively executed at predetermined time intervals.

In step S21, the controller 122 determines whether a first actuation signal has been received through the first communication path P1 by the wired communication unit 124. In a case where the controller 122 determines that a first actuation signal has not been received in step S21, the controller 122 ends processing. In a case where the controller 122 determines that a first actuation signal has been received in step S21, the controller 122 proceeds to step S22. In step S22, the controller 122 transmits the first actuation signal from the wired communication unit 124 through the first communication path P1 to the brake devices 40A and 40B corresponding to the brake operating devices 50A and 50B from which the first actuation signal originated and then proceeds to step S23.

In step S23, the controller 122 determines whether a first response signal has been received through the first communication path P1 and the wired communication unit 124 from the brake devices 40A and 40B to which the first actuation signal was transmitted. For example, an affirmative determination is given in step S23 in a case where a first response signal is received within a specified time from transmission of the first actuation signal. Alternatively, an affirmative determination is given in step S23 in a case where a first response signal is received during a period in which the first actuation signal is transmitted a specified number of times. In a case where the controller 122 determines that a first response signal has been received in step S23, the controller 122 ends processing. For example, the first response signal is transmitted from the electric assist drive unit 40D through the first communication path P1 to the brake operating devices 50A and 50B from which the first actuation signal originated. In a case where the controller 122 determines that a first response signal has not been received in step S23, the controller 112 proceeds to step S24. In step S24, the controller 122 transmits a second actuation signal from the wireless communication unit 126 through the second communication path P2 to the brake devices 40A and 40B corresponding to the brake operating devices 50A and 50B from which the first actuation signal originated.

In a case where the process of FIG. 12 is executed, the controller 102 of the first communication control device 82 in each of the brake operating devices 50A and 50B does not have to perform step S4 of FIG. 10 if a second response signal is received directly from the brake devices 40A and 40B or via the electric assist drive unit 40D even if a first response signal is not received.

In a case where the controller 122 of the electric assist drive unit 40D determines that a first response signal has not been received in step S23 of FIG. 12, the controller 122 can determine that an anomaly has occurred in the first communication path P1 between the electric assist drive unit 40D and the brake devices 40A and 40B, in the second junction 96, or in the brake devices 40A and 40B.

Second Embodiment

A control system 80 for a human-powered vehicle in accordance with a second embodiment will now be described with reference to FIGS. 13 to 19. Same reference numerals are given to those components of the control system 80 in accordance with the second embodiment that are the same as the corresponding components of the first embodiment. Such components will not be described in detail. FIGS. 1 to 3 and 5 to 9 will also be referenced.

Figure 13:
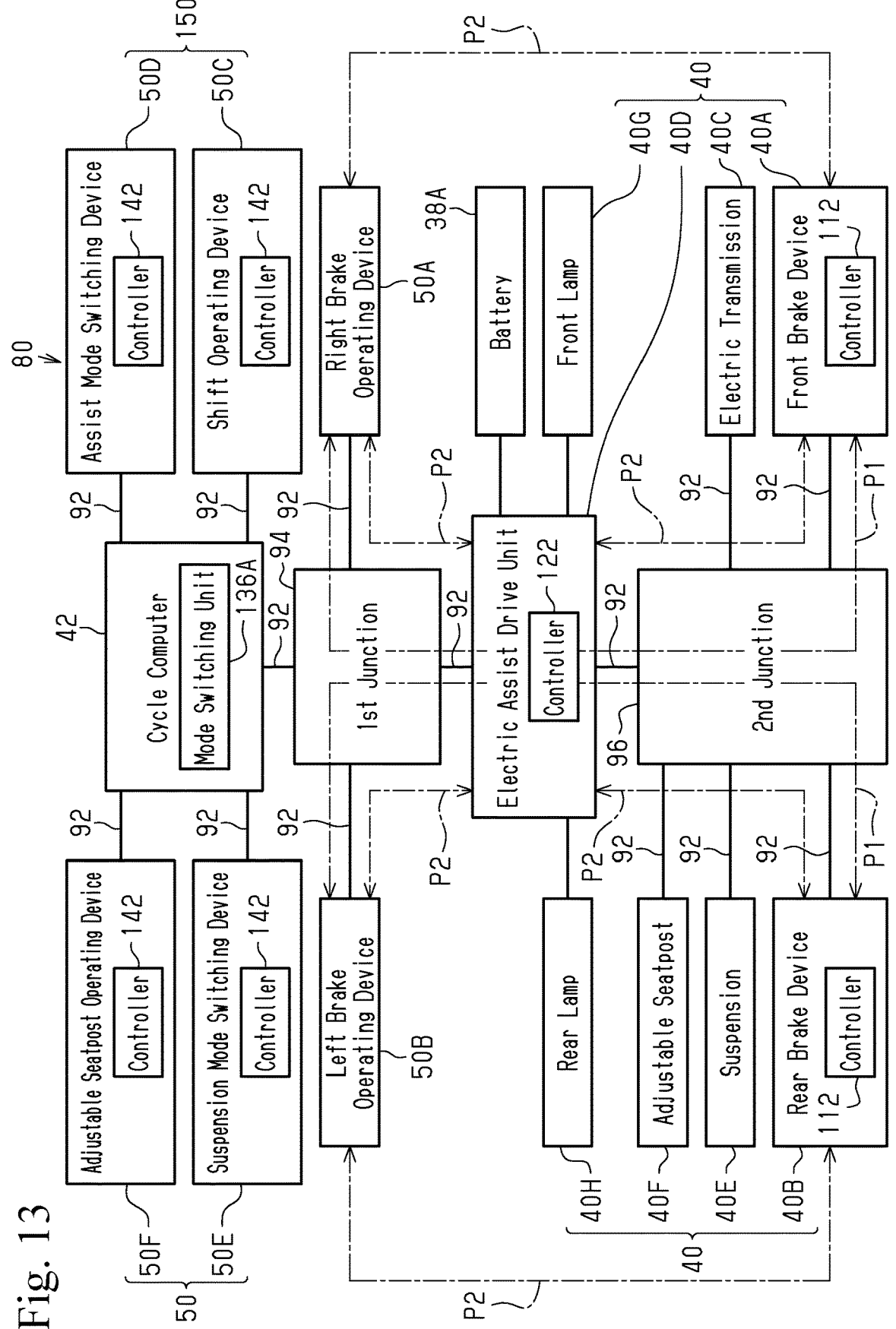
FIG. 13 is a block diagram showing the electrical configuration of a control system in accordance with a second embodiment.

As shown in FIG. 13, the control system 80 for a human-powered vehicle includes the brake devices 40A and 40B, the brake operating devices 50A and 50B, auxiliary brake operating devices 150, and the controllers 112, 122, and 142. The auxiliary brake operating devices 150 are operating devices 50 that differ from the brake operating devices 50A and 50B.

The auxiliary brake operating device 150 can include at least one of the shift operating device 50C, the assist mode switching device 50D, the suspension mode switching device 50E, and the adjustable seatpost operating device 50F. The auxiliary brake operating device 150 can further include a lamp operating device. The auxiliary brake operating device 150 can be the crank 28.

The controllers 112, 122, and 142 can be provided in at least one of the auxiliary brake operating device 150, the brake devices 40A and 40B, and the electric assist drive unit 40D. The controllers 112, 122, and 142 are configured to control the actuation device 40 including the brake devices 40A and 40B in accordance with a control mode. The control mode includes a first mode and a second mode. In a case where the control mode is the first mode, the controllers 112,

122, and 142 are configured to restrict actuation of the brake devices 40A and 40B that respond to operation of the auxiliary brake operating device 150. In a case where the control mode is the second mode, the controllers 112, 122, and 142 are configured to actuate the brake devices 40A and 40B in response to operation of the auxiliary brake operating device 150.

The control system 80 further includes the communication paths P1 and P2 provided between the brake devices 40A and 40B and the brake operating devices 50A and 50B. In a case where the first mode is selected as the control mode and at least one of the brake devices 40A and 40B, the brake operating devices 50A and 50B, and the communication paths P1 and P2 has an anomaly, the controllers 112, 122, and 142 are configured to switch the control mode from the first mode to the second mode. In one example, the communication path is a wired communication path. The control system 80 in accordance with the second embodiment can, but does not have to, include a wireless communication path. Thus, the communication control devices 82, 84, and 86 shown in FIGS. 5 to 7 include at least one of a wired communication unit and a wireless communication unit.

The control system 80 can further include a detection device configured to detect an anomaly in at least one of the brake devices 40A and 40B, the brake operating devices 50A and 50B, and the communication paths P1 and P2. In a case where the first mode is selected as the control mode and the detection device detects an anomaly, the controllers 112, 122, and 142 are configured to switch the control mode from the first mode to the second mode.

The detection device includes, for example, at least one of the controllers 102 of the brake operating devices 50A and 50B, the controllers 112 of the brake devices 40A and 40B, and the controller 122 of the electric assist drive unit 40D. For example, the controllers 102 of the brake operating devices 50A and 50B can be configured to detect an anomaly in at least one of the wired communication unit 104 and the wireless communication unit 106. The controllers 112 of the brake devices 40A and 40B can be configured to detect an anomaly in at least one of the wired communication unit 114 and the wireless communication unit 116. The controller 122 of the electric assist drive unit 40D can be configured to detect an anomaly in at least one of the wired communication unit 124 and the wireless communication unit 126. Further, the controllers 102, 112, and 122 can be configured to detect an anomaly in the communication paths P1 and P2 through communication between the brake operating devices 50A and 50B, the brake devices 40A and 40B, and the electric assist drive unit 40D. In a case where the communication paths P1 and P2 are wireless communication paths, an anomaly in a wireless communication path will include an anomaly in the wireless communication units 106, 116, and 126.

The brake operating devices 50A and 50B each include the brake lever 52 and the sensor 100 that detects operation of the brake lever 52. In a case where the first mode is selected as the control mode and the sensor 100 has an anomaly, the controllers 112, 122, and 142 can be configured to switch the control mode from the first mode to the second mode. An anomaly in the sensor 100 can be detected by the controllers 102 of the brake operating devices 50A and 50B. For example, the controller 102 determines that the sensor 100 has an anomaly in a case where there is an anomaly in the level of a signal received from the sensor 100.

The control system 80 can further include a mode switching unit 136A operated to switch the control mode from one of the first mode and the second mode to the other one of the first mode and the second mode. In the present embodiment, the mode switching unit 136A is included in the operating unit 136 of the cycle computer 42. The rider operates the mode switching unit 136A in a case where, for example, the rider notices an anomaly in the brake operating devices 50A and 50B. As a result, the controller 132 of the cycle computer 42 transmits an anomaly signal from the communication unit 134. In response to the anomaly signal, the controller 142 of the auxiliary brake operating device 150, the controllers 112 of the brake devices 40A and 40B, and the controller 122 of the electric assist drive unit 40D switch the control mode from the first mode to the second mode.

In a case where the control mode is the first mode, the controllers 112, 122, and 142 are configured to actuate an actuation device 40 that differs from the brake devices 40A and 40B in response to operation of the auxiliary brake operating device 150. The actuation device 40 that differs from the brake devices 40A and 40B can include at least one of the electric transmission 40C, the electric assist drive unit 40D, the suspension 40E, and the adjustable seatpost 40F. The actuation device 40 can further include at least one of the front lamp 40G and the rear lamp 40H. The auxiliary brake operating device 150 and the corresponding actuation device 40 can be configured to perform at least one of wired communication and wireless communication.

The auxiliary brake operating device 150 can be the crank 28. In a case where the control mode is the first mode, the controllers 112 of the brake devices 40A and 40B and the controller 122 of the electric assist drive unit 40D are configured to restrict actuation of the brake devices 40A and 40B in response to reverse rotation of the crank 28. In a case where the control mode is the second mode, the controllers 112, 122 are configured to actuate the brake devices 40A and 40B in response to reverse rotation of the crank 28. The controller 122 of the electric assist drive unit 40D detects reverse rotation of the crank 28 based on a detection signal from the crank sensor 74.

The controllers 112 and 122 can be configured to control the brake devices 40A and 40B and produce braking force that is in accordance with the reverse rotational speed of the crank 28. For example, in a case where the control mode is the second mode, the controller 122 of the electric assist drive unit 40D detects the reverse rotational speed of the crank 28 based on the detection signal from the crank sensor 74 and transmits an actuation signal that includes information indicating the reverse rotational speed to the brake devices 40A and 40B. In a case where the control mode is the second mode, the controllers 112 of the brake devices 40A and 40B drive the brake actuator 66 to produce braking force that is in accordance with the reverse rotational speed based on the actuation signal from the electric assist drive unit 40D.

An anomaly detection process executed by the controllers 102 of the brake operating devices 50A and 50B will now be described with reference to FIG. 14. The process illustrated in the flowchart of FIG. 14 is repetitively executed at predetermined time intervals.

In step S31, the controller 102 determines whether an anomaly has been detected. As described above, an anomaly can include, for example, an anomaly in the brake operating devices 50A and 50B or an anomaly in the communication paths P1 and P2. An anomaly in the brake operating devices 50A and 50B can include an anomaly in the sensor 100 or an anomaly in at least one of the wired communication unit 104 and the wireless communication unit 106. Upon determination in step S31 that an anomaly has been detected, the controller 102 proceeds to step S32 to transmit an anomaly signal and then ends processing. The anomaly signal can include information indicating the type of anomaly. In a case where the controller 102 determines in step S31 that an anomaly has not been detected, the controller 102 ends processing.

Figure 14:
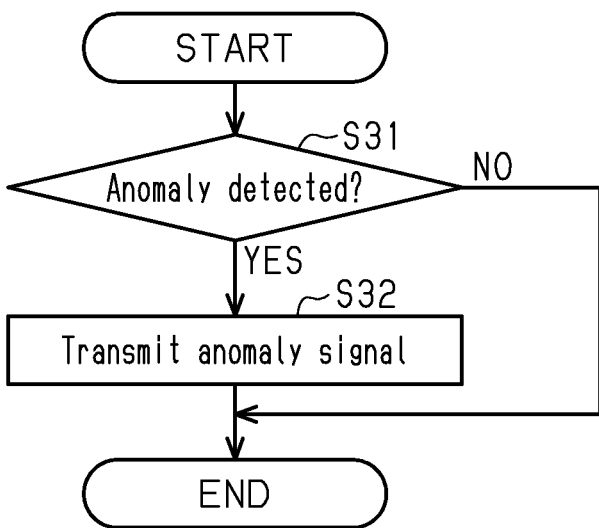
FIG. 14 is a flowchart of an anomaly detection process executed by a controller of a brake operating device illustrated in FIG. 13.

The controller 122 of the electric assist drive unit 40D and the controllers 112 of the brake devices 40A and 40B can also execute the process illustrated in FIG. 14. For example, the controller 122 of the electric assist drive unit 40D can determine whether there is an anomaly in the communication paths P1 and P2 or in at least one of the wired communication unit 124 and the wireless communication unit 126 and transmit an anomaly signal in a case where an anomaly is detected. The controller 122 of the electric assist drive unit 40D switches the control mode from the first mode to the second mode in a case where an anomaly is detected. The controllers 112 of the brake devices 40A and 40B can each determine whether there is an anomaly in the communication paths P1 and P2 or in at least one of the wired communication unit 114 and the wireless communication unit 116 and transmit an anomaly signal in a case where an anomaly is detected. The controllers 112 of the brake devices 40A and 40B switch the control mode from the first mode to the second mode in a case where an anomaly is detected.

Figure 15:
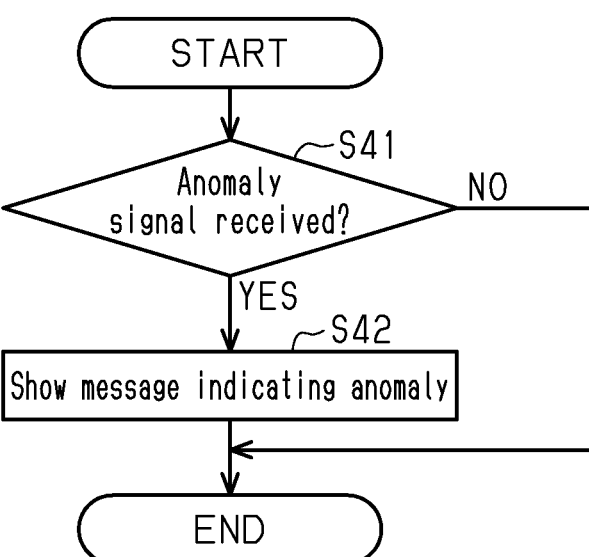
FIG. 15 is a flowchart of an anomaly detection process executed by a controller of a cycle computer illustrated in FIG. 13.

An anomaly indication process executed by the controller 132 of the cycle computer 42 will now be described with reference to FIG. 15. The process illustrated in the flowchart of FIG. 15 is repetitively executed at predetermined time intervals.

In step S41, the controller 132 determines whether an anomaly signal has been received. In a case where the controller 132 determines that an anomaly signal has not been received in step S41, the controller 132 ends processing. In a case where the controller 132 determines that an anomaly signal has been received in step S41, the controller 132 proceeds to step S42. In step S42, the controller 132 shows a message on the display 138 of the cycle computer 42 indicating that there is an anomaly and that the control mode will be switched from the first mode to the second mode. The controller 132 can be configured to show the type of anomaly on the display 138.

Figures 16, 17:
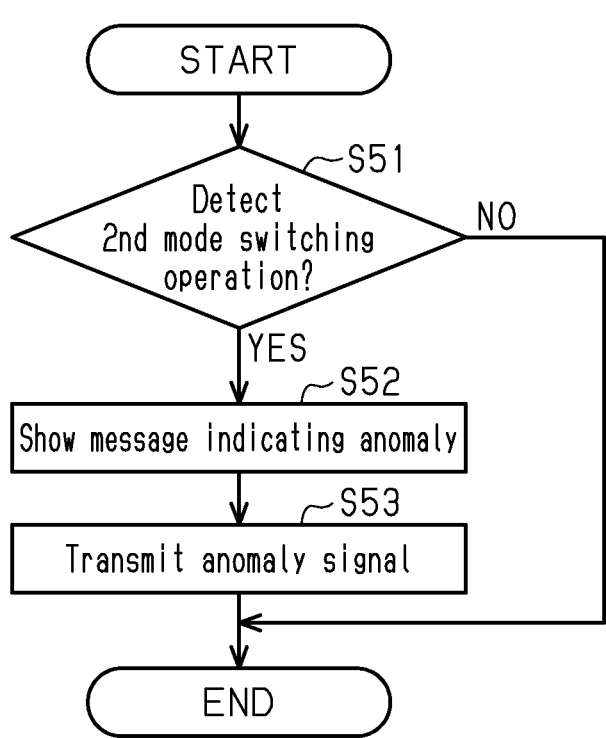
FIG. 16 is a flowchart of a mode switching operation detection process executed by the controller of the cycle computer illustrated in FIG. 13.
FIG. 17 is a flowchart of a mode switching process executed by a controller of a brake device illustrated in FIG. 13, a controller of an electric assist drive unit illustrated in FIG. 13, and a controller of an auxiliary brake operating device illustrated in FIG. 13.

A mode switching operation detection process executed by the controller 132 of the cycle computer 42 will now be described with reference to FIG. 16. The process illustrated in the flowchart of FIG. 16 is repetitively executed at predetermined time intervals.

In step S51, the controller 132 determines whether an operation for switching to the second mode with the mode switching unit 136A has been detected. In a case where the controller 132 determines that a second mode switching operation has not been detected in step S51, the controller 132 ends processing. In a case where the rider performs a process for switching from the first mode to the second mode with the mode switching unit 136A of the cycle computer 42, the controller 132 determines in step S51 that a second mode switching operation has been detected and then proceeds to step S52. In step S52, the controller 132 shows a message on the display 138 of the cycle computer 42 indicating that there is an anomaly and that the control mode will be switched from the first mode to the second mode. Then, the controller 132 proceeds to step S53. In step S53, the controller 132 transmits an anomaly signal and then ends processing.

A mode switching process executed by the controller 142 of the auxiliary brake operating device 150, the controllers 112 of the brake devices 40A and 40B, and the controller 122 of the electric assist drive unit 40D will now be described with reference to FIG. 17. The process illustrated in the flowchart of FIG. 17 is repetitively executed at predetermined time intervals.

In step S61, the controllers 112, 122, and 142 determine whether an anomaly signal has been received. The origin of the anomaly signal can be at least one of the brake operating devices 50A and 50B, the brake devices 40A and 40B, the electric assist drive unit 40D, and the cycle computer 42. In a case where the controllers 112, 122, and 142 determine that an anomaly signal has not been received in step S61, the controllers 112, 122, and 142 proceed to step S62. In step S62, the controllers 112, 122, and 142 maintain the control mode in the first mode. In a case where the controllers 112, 122, and 142 determine that an anomaly signal has been received in step S61, the controllers 112, 122, and 142 proceed to step S63. In step S63, the controllers 112, 122, and 142 switch the control mode from the first mode to the second mode and then ends processing.

An example in which the shift operating device 50C is used as the auxiliary brake operating device 150 will now be described with reference to FIG. 18. FIG. 18 illustrates a brake operating process executed by the controller 142 of the shift operating device 50C. The process illustrated in the flowchart of FIG. 18 is repetitively executed at predetermined time intervals.

In step S71, the controller 142 determines whether operation of the operating unit 146 of the shift operating device 50C, more specifically, operation of the shift-up switch 54A or the shift-down switch 54B, has been detected. In a case where the controller 142 determines that operation of the operating unit 146 has not been detected in step S71, the controller 142 ends processing. In a case where the controller 142 determines that operation of the operating unit 146 has been detected in step S71, the controller 142 proceeds to step S72.

In step S72, the controller 142 determines whether the control mode is the first mode. In a case where the controller 142 determines that the control mode is the first mode in step S72, the controller 142 proceeds to step S73. In step S73, the controller 142 transmits an actuation signal to the electric transmission 40C and then ends processing. Accordingly, in a case where the control mode is the first mode, the electric transmission 40C performs a shifting operation in response to the actuation signal. The controller 142 of the shift operating device 50C restricts actuation of the brake devices 40A and 40B in response to operation of the shift operating device 50C.

In a case where the controller 142 determines that the control mode is the second mode and not the first mode in step S72, the controller 142 proceeds to step S74. In step S74, the controller 142 transmits an actuation signal to the brake devices 40A and 40B and then ends processing. Accordingly, in a case where the control mode is the second mode, the brake devices 40A and 40B perform a braking operation in response to receipt of the actuation signal. The electric transmission 40C does not perform a shifting operation.

Instead of the shift operating device 50C or in addition to the shift operating device 50C, one or more operating devices 50 other than the shift operating device 50C can be used as the auxiliary brake operating device 150. For example, the operating device 50 includes at least one of the assist mode switching device 50D, the suspension mode switching device 50E, and the adjustable seatpost operating device 50F. In this case, the controller 142 of each of the operating devices 50D, 50E, and 50F executes the process illustrated in the flowchart of FIG. 18 in the same manner as the controller 142 of the shift operating device 50C. In this case, the destination of the actuation signal transmitted in step S73 is the actuation devices 40 corresponding to the operating devices 50D, 50E, and 50F.

An example in which the crank 28 is used as the auxiliary brake operating device 150 will now be described with reference to FIG. 19. FIG. 19 is a brake operating process executed by the controller 122 of the electric assist drive unit 40D. The process illustrated in the flowchart of FIG. 19 is repetitively executed at predetermined time intervals.

As shown in FIG. 19, in step S81, the controller 122 determines whether the crank sensor 74 has detected reverse rotation of the crank 28. In a case where the controller 122 determines that reverse rotation of the crank 28 has not been detected in step S81, the controller 122 ends processing. In a case where the controller 122 determines that reverse rotation of the crank 28 has been detected in step S81, the controller 122 proceeds to step S82. In step S82, the controller 122 determines whether the control mode is the first mode. In a case where the controller 122 determines that the control mode is the first mode in step S82, the controller 122 ends processing. Accordingly, in a case where the control mode is the first mode, the controller 122 of the electric assist drive unit 40D restricts actuation of the brake devices 40A and 40B in response to reverse rotation of the crank 28.

In a case where the controller 122 determines that the control mode is the second mode and not the first mode in step S82, the controller 122 proceeds to step S83. In step S83, the controller 122 transmits an actuation signal to the brake devices 40A and 40B and then ends processing. Accordingly, in a case where the control mode is the second mode, the brake devices 40A and 40B perform a braking operation in response to receipt of the actuation signal.

The controller 122 of the electric assist drive unit 40D can transmit an actuation signal to the brake devices 40A and 40B in response to detection of reverse rotation of the crank 28 regardless of whether the control mode is the first mode or the second mode. In this case, the controllers 112 of the brake devices 40A and 40B can restrict actuation of the brake devices 40A and 40B in response to an actuation signal in a case where the control mode is the first mode.

Modified Examples

The description related with the above embodiments exemplifies, without any intention to limit, applicable forms of a control system according to the present disclosure. The control system according to the present disclosure is applicable to, for example, modified examples of the above embodiments that are described below and combinations of at least two of the modified examples that do not contradict each other. In the modified examples described hereinafter, same reference numerals are given to those components that are the same as the corresponding components of the above embodiments. Such components will not be described in detail.

Figure 20:
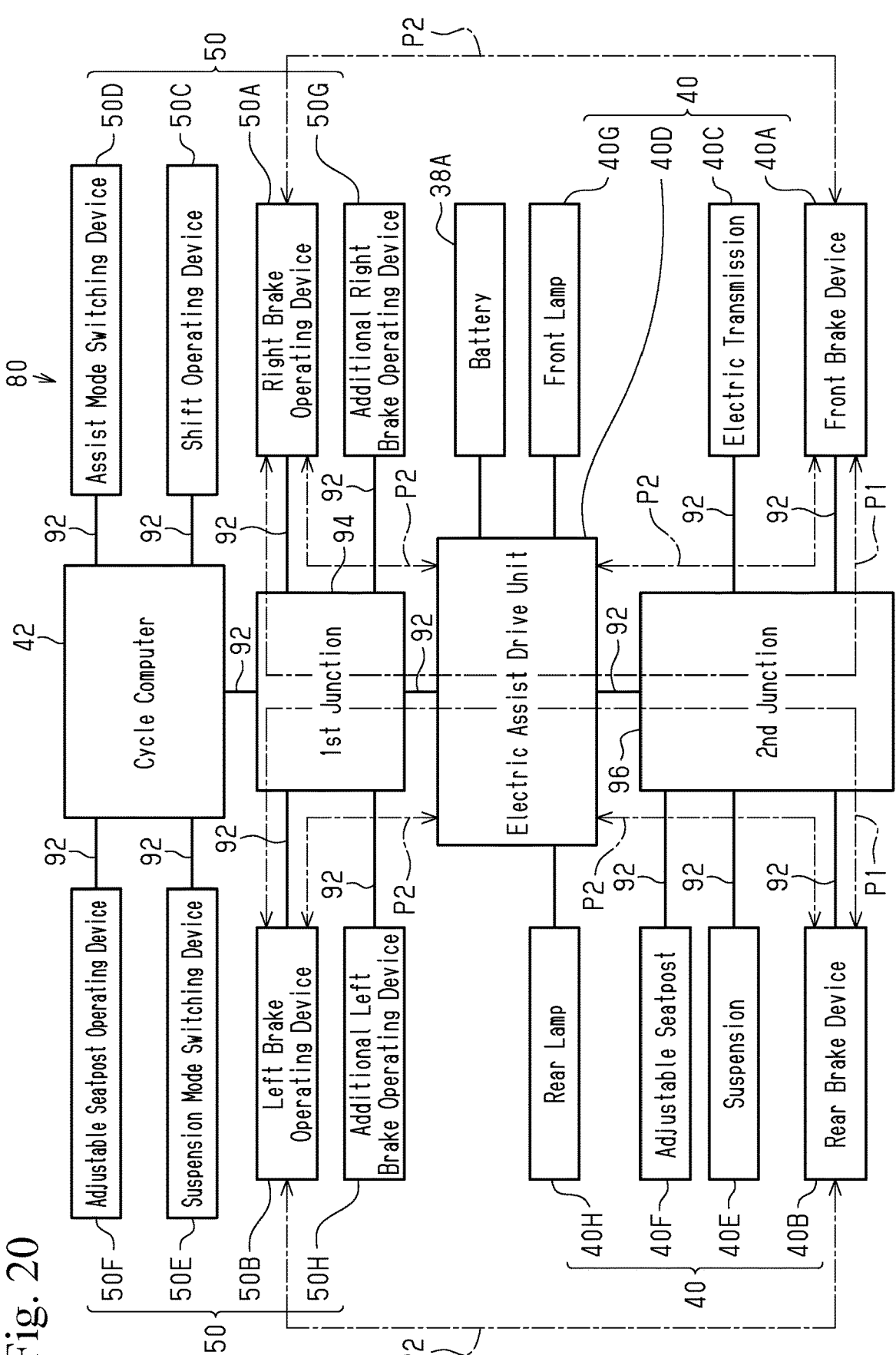
FIG. 20 is a block diagram showing the electrical configuration of a control system in accordance with a second embodiment.

One or more additional brake operating devices can be provided in addition to the right brake operating device 50A and the left brake operating device 50B. For example, as shown in FIG. 20, the control system 80 in accordance with the first embodiment shown in FIG. 20 can include an additional right brake operating device 50G and an additional left brake operating device 50H in addition to the right brake operating device 50A and the left brake operating device 50B. The right brake operating device 50A and the additional right brake operating device 50G can be arranged at different positions on a right portion of the handlebar 24. The left brake operating device 50B and the additional left brake operating device 50H can be arranged at different positions on a left portion of the handlebar 24. The additional right brake operating device 50G and the additional left brake operating device 50H can each include a brake lever or a brake switch. The right brake operating device 50A and the additional right brake operating device 50G can be configured to actuate the front brake device 40A, and the left brake operating device 50B and the additional left brake operating device 50H can be configured to actuate the rear brake device 40B.

The right and left brake operating devices 50A and 50B can be combined with the front and rear brake devices 40A and 40B to have any corresponding relationship. For example, each of the right and left brake operating devices 50A and 50B can each be configured to actuate both of the front and rear brake devices 40A and 40B.

The first communication path P1, which is a wired communication path, can be provided between the right brake operating device 50A and the left brake operating device 50B. The first communication path P1, which is a wired communication path, can be provided between the front brake device 40A and the rear brake device 40B.

The second communication path P2, which is a wireless communication path, can be provided between the right brake operating device 50A and the left brake operating device 50B. The second communication path P2, which is a wireless communication path, can be provided between the front brake device 40A and the rear brake device 40B.

The right brake operating device 50A can be configured to monitor the left brake operating device 50B for anomalies. The left brake operating device 50B can be configured to monitor the right brake operating device 50A for anomalies.

The front brake device 40A can be configured to monitor the rear brake device 40B for anomalies. The rear brake device 40B can be configured to monitor the front brake device 40A for anomalies.

The electric assist drive unit 40D does not have to include the wireless communication unit 126.

The human-powered vehicle 10 does not have to include the electric assist drive unit 40D.

Elements such as the actuation device 40 and the operating devices 50 do not have to incorporate batteries.

In a case where elements such as the actuation device 40 and the operating devices 50 each incorporate a battery, the human-powered vehicle 10 does not have to include the battery unit 38.

The wireless communication units 106, 116, and 126 can be arranged on the outer side of the main body of each of the brake devices 40A and 40B, the brake operating devices 50A and 50B, and the electric assist drive unit 40D or at a location separated from the main body. The wireless communication units 106, 116, and 126 are connected by a wired to the main body. The same applies in a case where an element of a human-powered vehicle includes a wireless communication unit.

In a case where a first response signal is not received from the second communication control device 84, a message indicating such a state can be shown on the display 138 of the cycle computer 42.

In a case where the first communication control device 82 transmits a second actuation signal upon detection of operation of the brake lever 52, the first communication control device 82 can first transmit a first actuation signal in response to the next operation of the brake lever 52 or transmit the second actuation signal without transmitting the first actuation signal. More specifically, in the flowchart of FIG. 10, after step S4 is performed once, in response to detection of the next operation of the brake lever 52, steps S2 to S4 can all be performed or only step S4 can be performed. In the same manner, in the flowchart of FIG. 12, after step S24 is performed once, in response to receipt of the next first actuation signal from the brake operating devices 50A and 50B, steps S22 to S24 can all be performed or only step S24 can be performed.

The first communication control device 82 can transmit the first actuation signal and the second actuation signal at the same time or at slightly shifted times. In this case, the second communication control device 84 transmits a first response signal in response to receipt of a first actuation signal and a second response signal in response to receipt of a second actuation signal. In a case where the first response signal or the second response signal cannot be received, a message indicating such a state can be shown on the display 138 of the cycle computer 42.

In this specification, the phrase "at least one of" as used in this disclosure means "one or more" of a desired choice. As one example, the phrase "at least one of" as used in this disclosure means "only one choice" or "both of two choices" in a case where the number of choices is two. In another example, the phrase "at least one of" as used in this disclosure means "only one single choice" or "any combination of two or more choices" if the number of its choices is three or more.

DESCRIPTION OF REFERENCE CHARACTERS

10) human-powered vehicle, 12, 14) wheel, 28) crank, 40) actuation device, 40A, 40B) brake device, 40C) electric transmission, 40D) electric assist drive unit, 40E) suspension, 40F) adjustable seatpost, 50) operating device, 50A, 50B) brake operating device, 52) brake lever, 80) control system, 82) first communication control device, 84) second communication control device, 86) third communication control device, 100) sensor, 104, 114, 124) wired communication unit 106, 116, 126) wireless communication unit, 112, 122, 142) controller, 136A) mode switching unit, 150) auxiliary brake operating device, P1) first communication path, P2) second communication path

The invention claimed is:

1. A control system for a human-powered vehicle, the control system comprising:
   a brake device configured to brake a wheel;
   a brake operating device operated to actuate the brake device;
   a first communication path configured to communicate a first actuation signal between the brake device and the brake operating device; and
   a second communication path configured to communicate a second actuation signal between the brake device and the brake operating device, wherein
   the second communication path differs from the first communication path,
   the first communication path is a wired electrical communication path, and
   the second communication path is a wireless communication path.

2. The control system according to claim 1, further comprising:
   a first communication control device provided in the brake operating device;

a second communication control device provided in the brake device; and
   a third communication control device provided in at least one of the brake operating device and the first communication path, wherein
   the first communication control device is configured to transmit the first actuation signal through the first communication path in response to operation of the brake operating device,
   the second communication control device is configured to transmit a response signal in response to receipt of the first actuation signal, and
   the third communication control device is configured to transmit the second actuation signal to the second communication control device through the second communication path in a case where the response signal cannot be received from the second communication control device after the first actuation signal is transmitted from the first communication control device.

3. The control system according to claim 2, wherein the first communication control device also functions as the third communication control device.

4. A control system for a human-powered vehicle, the control system comprising:
   an actuation device;
   an operating device operated to actuate the actuation device;
   a first communication control device provided in the operating device;
   a second communication control device provided in the actuation device;
   a first communication path configured to communicate a first actuation signal between the first communication control device and the second communication control device;
   a third communication control device provided in at least one of the operating device and the first communication path; and
   a second communication path configured to communicate a second actuation signal between the second communication control device and the third communication control device, wherein the second communication path differs from the first communication path, wherein
   the first communication control device is configured to transmit the first actuation signal through the first communication path in response to operation of the operating device,
   the second communication control device is configured to transmit a response signal in response to receipt of the first actuation signal, and
   the third communication control device is configured to transmit the second actuation signal through the second communication path in a case where the response signal cannot be received from the second communication control device after the first actuation signal is transmitted from the first communication control device.

5. The control system according to claim 4, wherein the actuation device includes at least one of a brake device, an electric transmission, an electric assist drive unit, a suspension, and an adjustable seatpost.

6. The control system according to claim 4, wherein the first communication control device also functions as the third communication control device.

7. The control system according to claim 2, wherein the third communication control device is provided in a component located in the first communication path.

8. The control system according to claim 2, wherein the second communication control device is configured to transmit a first response signal in response to receipt of the first actuation signal through the first communication path, and the second communication control device is configured to transmit a second response signal through the second communication path in response to receipt of the second actuation signal.

9. The control system according to claim 2, wherein one of the first communication path and the second communication path is a wired communication path;

the other one of the first communication path and the second communication path is a wireless communication path; and the first communication control device, the second communication control device, and the third communication control device each include a wired communication unit configured to perform wired communication and a wireless communication unit configured to perform wireless communication.

10. The control system according to claim 2, wherein the first communication path is a wired communication path;

the second communication path is a wireless communication path; and the first communication control device, the second communication control device, and the third communication control device each include a wired communication unit configured to perform wired communication through the first communication path and a wireless communication unit configured to perform wireless communication through the second communication path.

11. The control system according to claim 1, wherein each of the first communication path and the second communication path is a wired communication path or a wireless communication path.

12. The control system according to claim 1, wherein one of the first communication path and the second communication path is a wired communication path, and the other one of the first communication path and the second communication path is a wireless communication path.

13. A control system for a human-powered vehicle, the control system comprising:

a brake device configured to brake a wheel;

a brake operating device operated to actuate the brake device;

an auxiliary brake operating device that differs from the brake operating device; and a controller configured to control an actuation device that includes the brake device in accordance with a control mode, wherein the auxiliary brake operating device is one of a shift operating device, an assist mode switching device, a suspension mode switching device, and an adjustable seatpost operating device, the control mode includes a first mode and a second mode, the controller is configured to restrict actuation of the brake device in response to operation of the auxiliary brake operating device in a case where the control mode is the first mode, and the controller is configured to actuate the brake device in response to operation of the auxiliary brake operating device in a case where the control mode is the second mode.

14. The control system according to claim 13, further comprising:

a communication path provided between the brake device and the brake operating device, wherein in a case where the first mode is selected as the control mode and at least one of the brake device, the brake operating device, and the communication path has an anomaly, the controller is configured to switch the control mode from the first mode to the second mode.

15. The control system according to claim 14, further comprising:

a detection device configured to detect the anomaly in at least one of the brake device, the brake operating device, and the communication path, wherein in a case where the first mode is selected as the control mode and the detection device detects the anomaly, the controller is configured to switch the control mode from the first mode to the second mode.

16. The control system according to claim 14, wherein the communication path is a wired communication path.

17. The control system according to claim 13, wherein the brake operating device includes a brake lever and a sensor that detects operation of the brake lever, and in a case where the first mode is selected as the control mode and the sensor has an anomaly, the controller is configured to switch the control mode from the first mode to the second mode.

18. The control system according to claim 13, further comprising:

a mode switching unit operated to switch the control mode between the first mode and the second mode.

19. The control system according to claim 13, wherein the controller is configured to actuate an actuation device that differs from the brake device in response to operation of the auxiliary brake operating device in a case where the control mode is the first mode.

20. The control system according to claim 19, wherein the actuation device that differs from the brake device includes at least one of an electric transmission, an electric assist drive unit, a suspension, and an adjustable seatpost.

21. The control system according to claim 13, wherein the auxiliary brake operating device is a crank, the controller is configured to restrict actuation of the brake device in response to reverse rotation of the crank in a case where the control mode is the first mode, and the controller is configured to actuate the brake device in response to reverse rotation of the crank in a case where the control mode is the second mode.

22. The control system according to claim 21, wherein the controller is configured to control the brake device and produce braking force that is in accordance with a reverse rotational speed of the crank.

23. The control system according to claim 13, wherein the controller is provided in at least one of the auxiliary brake operating device, the brake device, and the electric assist drive unit.

* * * * *